United States Patent
Smith et al.

(10) Patent No.: US 6,965,895 B2
(45) Date of Patent: *Nov. 15, 2005

(54) METHOD AND APPARATUS FOR ANALYZING MANUFACTURING DATA

(75) Inventors: Shawn B. Smith, Palo Alto, CA (US); Brian P. Grigsby, Austin, TX (US); Hung J. Pham, Leander, TX (US); Tony L. Davis, Austin, TX (US); Manjunath S. Yedatore, Austin, TX (US); William R. Clements, III, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 10/194,920

(22) Filed: Jul. 12, 2002

(65) Prior Publication Data

US 2003/0061212 A1 Mar. 27, 2003

Related U.S. Application Data

(60) Provisional application No. 60/305,256, filed on Jul. 16, 2001, provisional application No. 60/308,125, filed on Jul. 30, 2001, provisional application No. 60/308,121, filed on Jul. 30, 2001, provisional application No. 60/308,124, filed on Jul. 30, 2001, provisional application No. 60/308,123, filed on Jul. 30, 2001, provisional application No. 60/308,122, filed on Jul. 30, 2001, provisional application No. 60/309,787, filed on Aug. 6, 2001, and provisional application No. 60/310,632, filed on Aug. 6, 2001.

(51) Int. Cl.⁷ .............................................. G06F 17/30
(52) U.S. Cl. ............................... 707/10; 707/5; 707/6; 707/101; 707/104.1; 706/25
(58) Field of Search .......................... 707/5, 6, 10, 101, 707/104.1, 1, 3, 103 Y; 706/11, 12, 16, 25, 26, 44; 715/854

(56) References Cited

U.S. PATENT DOCUMENTS

| | | | |
|---|---|---|---|
| 5,097,141 A | 3/1992 | Leivian et al. | 706/12 |
| 5,222,210 A | 6/1993 | Leivian et al. | 715/854 |
| 5,692,107 A | 11/1997 | Simoudis et al. | 395/50 |
| 5,819,245 A | 10/1998 | Peterson et al. | 706/16 |
| 5,897,627 A | 4/1999 | Leivian et al. | 706/12 |
| 5,926,809 A * | 7/1999 | Szalwinski | 707/3 |
| 6,571,227 B1 * | 5/2003 | Agrafiotis et al. | 706/15 |
| 6,839,713 B1 * | 1/2005 | Shi et al. | 707/101 |
| 6,878,517 B1 * | 4/2005 | Benson | 435/6 |

OTHER PUBLICATIONS

"Mining semiconductor manufacturing data for productivity improvement . . . " by R. M. Dabbas et al. in *Computers in Industry*, vol. 45. pp. 29–44, May 2001.

"Solving Tough Semiconductor Manufacturing Problems Using Data Mining" by R. Gardner et al. *IEEE/SEMI Advanced Semiconductor Manuf. Conf.* Sep. 12, 2000, pp. 46–55.

"Yield Analysis and Data Management Using Yield Manager" by F. Lee et al., *IEEE/SEMI Advanced Semiconductor Manuf. Conf.* Sep. 22–25, 1998, pp. 19–30.

"Architecture of Data Mining Server: DATAFRONT/Serveer" by H. Ashida et al. *Systems, Man and Cybernetics*, 1999, IEEE SMC '99 Conference Proc. Oct. 12, 1999 pp. 882–887.

* cited by examiner

Primary Examiner—Shahid Alam
(74) Attorney, Agent, or Firm—Robert J. Stern

(57) ABSTRACT

A method for data mining information obtained in an integrated circuit fabrication factory ("fab") that includes steps of: (a) gathering data from the fab from one or more of systems, tools, and databases that produce data in the fab or collect data from the fab; (b) formatting the data and storing the formatted data in a source database; (c) extracting portions of the data for use in data mining in accordance with a user specified configuration file; (d) data mining the extracted portions of data in response to a user specified analysis configuration file; (e) storing results of data mining in a results database; and (f) providing access to the results.

24 Claims, 21 Drawing Sheets

SEGMENT 1

Analysis Methods
Name: Idrives
Mask: %L1T3IDS|ETEST_15C0351X5737_MET2%,%L2T3IDS|ETEST_15C035 . . .

Properties Unique to this Mask

Rule Induction
    Used: Yes
  Significance: 1
    Sigma: [.1.1]
   Question: [H.L]
  Rule Accuracy: 60
  Rule Coverage: 10
 Rule Confidence: 60
  RI Beam Width: 32
 Max. Rule Depth: 2
  Max Equivalent: 2

SOM
    Used: Yes
Top Region Count: 3
 Region Type: POND
Top Map Matches: 5
  Quality List: 20

MahaCu
      Used: Yes
Number of Top Scores: 10
   Scoring Type: GAP
  Scoring Threshold: 80
Apply Threshold to Plot: Yes
Avg. Rec. per Category: 2
 Min. Category Count:
 Diameter Threshold: 1.77
  MahaCu Reverse: No
Ranking Time Zones: 0
  Distribution Plots: No

FIG. 11

```
[ANALYSIS_METHODS]
DATABASE_CONNECTION_STR=kfabauto
DATA_CUBE_MASK=1053_PEL.GKS
2ND_DATA_CUBE_MASK=1053_EFL.GKS
DATE_MASKS=DATE_MASK1,DATE_MASK2
RULE_INDUCTION=1
SOM=1
MAHACu=0
APPLY_RULE_FILE=0

DRAW_BEST_FIT_LINE=0
DATA_CLEANER=1
SCATTER_2D_PLOT_SCALE=90
SCATTER_3D_PLOT_SCALE=90
GRAPH_DATA_WRITE_THESE_COLS=LEVEL1, WAFER%,DATE_OUT%

;multiple filters go on same line separated by comma
;[RULE_BASE]
;RULE_FULE = \\lauren\GKS\Customers\KFabauto\RuleBaseRules\HoldingPen\1053_FILTER_RUL
```

FIG. 12

A HYPER-PYRAMID CUBE

A HYPER-PYRAMID CUBE LAYER (HYPER-CUBE)

LAYER 6 IS THE SOM MAP FOR COLUMN 6 OF THE DATA SET

CELL PROJECTION THROUGH A HYPER-CUBE

| DEVICE | LOT | LOT_END_TIME | BIN_32 | BIN_54 | BIN_30 | TRACKIN_203_LSR_ASH | Eq_Id_203_LSR_ASH | TRACKIN_218_LSR_STRIP | Eq_Id_218_LSR_STRIP |
|---|---|---|---|---|---|---|---|---|---|
| 1234XYD | 221102703 | 26-Jun-01 | 24.09 | 4.55 | 8.18 | 2001-05-10-13-09 | ETGAS35Q7 | 2001-05-10-14-52 | ETNSWS03 |
| 1234XYD | 221180250 | 23-Jun-01 | 23.33 | 2.08 | 18.25 | 2001-05-10-06-27 | ETGAS35Q4 | 2001-05-10-07-27 | ETNSWS03 |
| 1234XYD | 221180080 | 30-Jun-01 | 15.00 | 3.33 | 12.50 | 2001-05-01-09-52 | ETGAS35Q4 | 2001-05-01-10-48 | ETNSWS03 |
| 1234XYD | 221180070 | 28-Jun-01 | 16.96 | 2.61 | 3.04 | 2001-05-01-09-02 | ETGAS35Q7 | 2001-05-01-10-13 | ETNSWS03 |
| 1234XYD | 221170460 | 26-Jun-01 | 14.00 | 2.00 | 5.00 | 2001-04-28-01-10 | ETGAS35Q2 | 2001-04-26-02-27 | ETNSWS03 |
| 1234XYD | 221170130 | 23-Jun-01 | 20.42 | 3.33 | | 2001-04-25-08-57 | ETGAS35Q1 | 2001-04-25-10-00 | ETNSWS03 |
| 1234XYD | 221458000 | 26-Jun-01 | 14.17 | 4.17 | 0.42 | 2001-04-25-04-51 | ETGAS35Q5 | 2001-04-25-05-44 | ETNSWS03 |
| 1234XYD | 221170110 | 28-Jun-01 | 24.58 | 3.75 | 20.83 | 2001-04-25-01-58 | ETGAS35Q6 | 2001-04-25-02-53 | ETNSWS03 |
| 1234XYD | 221160510 | 26-Jun-01 | 16.00 | 3.80 | 2.80 | 2001-04-25-06-34 | ETGAS35Q7 | 2001-04-21-08-07 | ETNSWS03 |
| 1234XYD | 221160400 | 26-Jun-01 | 16.00 | 2.40 | 9.20 | 2001-04-19-03-59 | ETULVETNP | 2001-04-20-02-39 | ETNSWS03 |
| 1234XYD | 221180280 | 27-Jun-01 | 18.00 | 1.60 | 20.80 | 2001-04-19-03-19 | ETULVETNP | 2001-04-19-05-18 | ETNSWS03 |
| 1234XYD | 221160180 | 25-Jun-01 | 13.33 | 5.00 | 15.42 | 2001-04-18-06-39 | ETGAS35Q6 | 2001-04-18-11-19 | ETNSWS03 |
| 1234XYD | 221160150 | 26-Jun-01 | 32.92 | 3.75 | 2.06 | 2001-04-18-11-15 | ETGAS35Q5 | 2001-04-18-12-20 | ETNSWS03 |
| 1234XYD | 221150820 | 25-Jun-01 | 20.42 | 4.55 | 10.42 | 2001-04-15-10-09 | ETGAS35P1 | 2001-04-15-11-28 | ETNSWS03 |
| 1234XYD | 221150810 | 17-Jun-01 | 19.58 | 5.00 | 1.67 | 2001-04-15-10-26 | ETGAS35Q7 | 2001-04-15-11-26 | ETNSWS03 |
| 1234XYD | 221150800 | 24-Jun-01 | 21.74 | 3.48 | 10.87 | 2001-04-15-07-37 | ETGAS35Q5 | 2001-04-15-10-13 | ETNSWS03 |
| 1234XYD | 221150730 | 24-Jun-01 | 26.33 | 4.17 | 11.25 | 2001-04-14-17-18 | ETGAS35P6 | 2001-04-14-01-09 | ETNSWS03 |
| 1234XYD | 221150830 | 26-Jun-01 | 15.80 | 7.20 | 2.40 | 2001-04-13-23-37 | ETGAS35P2 | 2001-04-14-01-09 | ETNSWS03 |
| 1234XYD | 221150600 | 25-Jun-01 | 15.20 | 2.00 | 28.80 | 2001-04-13-21-48 | ETGAS35Q5 | 2001-04-13-23-06 | ETNSWS03 |
| 1234XYD | 221138270 | 27-Jun-01 | 17.08 | 3.33 | 6.57 | 2001-03-28-13-17 | ETGAS35P1 | 2001-03-28-18-40 | ETNSWS03 |

FIG. 21

| TOOL ID | Number of Lots |
|---------|----------------|
| XTOOL1  | 44             |
| XTOOL2  | 51             |
| XTOOL3  | 6              |

*Example of scoring threshold filtering under-represented tools.*

FIG. 23

```
DefectRecordSpec 13DEFECTID XREL YREL XINDEX YINDEX XSIZE YSIZE DEFECTAREA DSIZE CLASSNUMBER TEST IMAGECOUNT IMAGELIST,
DefectList
1 3.6295660000e+003 3.1987050000e+003 0 2 0.999000 0.999000 0.032000 1.790000000e-001 95 1 0 0
2 1.2501635000e+004 1.1613669000e+004 2 1 0.250000 0.250000 0.011900 1.090000000e-001 0 1 0 0
3 1.4073433000e+004 1.6317668000e+004 -1 0 0.499000 0.250000 0.019200 1.390000000e-001 0 1 0 0
4 4.4211260000e+003 4.5963820000e+003 0 -1 0.499000 0.499000 0.019200 1.390000000e-001 166 1 0 0
5 4.1131850000e+003 2.7772780000e+003 -3 -1 0.250000 0.011900 1.090000000e-001 166 1 0 0
```

*Example of a defect file to be transferred by the data translation algorithm*

FIG. 24

| LOTID | WAFERID | DATE_OUT | DIE_X | DIE_Y | CATERGORY | Bin Code | IM6API_Size-.2u | IM6API_Size-.2-.4u | IM6API_Size-.4-.8u | IM6API_Size-.6-.8u |
|---|---|---|---|---|---|---|---|---|---|---|
| 37989 | 7 | 37016 | 5 | 12 | Bad_Die | F | 0 | 0 | 1 | 0 |
| 37989 | 7 | 37016 | 5 | 13 | Bad_Die | F | 0 | 0 | 0 | 0 |
| 37989 | 7 | 37016 | 5 | 15 | Bad_Die | F | 0 | 0 | 2 | 0 |
| 37989 | 7 | 37016 | 5 | 16 | Bad_Die | A | 0 | 0 | 1 | 1 |
| 37989 | 7 | 37016 | 5 | 17 | Bad_Die | F | 0 | 0 | 1 | 0 |
| 37989 | 7 | 37016 | 5 | 19 | Bad_Die | F | 0 | 0 | 0 | 0 |
| 37989 | 7 | 37016 | 13 | 6 | Bad_Die | F | 0 | 0 | 0 | 1 |
| 37989 | 7 | 37016 | 13 | 7 | Bad_Die | A | 0 | 0 | 1 | 0 |
| 37989 | 7 | 37016 | 9 | 10 | Bad_Die | A | 0 | 0 | 0 | 0 |
| 37989 | 7 | 37016 | 13 | 8 | Bad_Die | A | 0 | 0 | 1 | 0 |
| 37989 | 7 | 37016 | 9 | 11 | Bad_Die | F | 0 | 0 | 1 | 1 |
| 37989 | 7 | 37016 | 9 | 12 | Bad_Die | A | 0 | 0 | 0 | 1 |
| 37989 | 7 | 37016 | 7 | 3 | Bad_Die | F | 0 | 0 | 0 | 0 |
| 37989 | 7 | 37016 | 9 | 13 | Bad_Die | F | 0 | 0 | 0 | 0 |
| 37989 | 7 | 37016 | 7 | 4 | Bad_Die | 9 | 0 | 0 | 0 | 0 |
| 37989 | 7 | 37016 | 9 | 14 | Bad_Die | A | 0 | 0 | 0 | 0 |
| 37989 | 7 | 37016 | 7 | 5 | Bad_Die | A | 0 | 0 | 3 | 0 |

FIG. 25

*Example of a datamatrix translated by the data translation algorithm*

METHOD AND APPARATUS FOR ANALYZING MANUFACTURING DATA

This application claims the benefit of: (1) U.S. Provisional Application No. 60/305,256, filed on Jul. 16, 2001; (2) U.S. Provisional Application No. 60/308,125, filed on Jul. 30, 2001; (3) U.S. Provisional Application No. 60/308,121 filed on Jul. 30, 2001; (4) U.S. Provisional Application No. 60/308,124 filed on Jul. 30, 2001; (5) U.S. Provisional Application No. 60/308,123 filed on Jul. 30, 2001; (6) U.S. Provisional Application No. 60/308,122 filed on Jul. 30, 2001; (7) U.S. Provisional Application No. 60/309,787 filed on Aug. 6, 2001; and (8) U.S. Provisional Application No. 60/310,632 filed on Aug. 6, 2001, all of which are incorporated herein by reference.

TECHNICAL FIELD OF THE INVENTION

One or more embodiments of the present invention pertain to methods and apparatus for analyzing information generated in a factory such as, for example, and without limitation, an integrated circuit ("IC") manufacturing or fabrication factory (a "semiconductor fab" or "fab").

BACKGROUND OF THE INVENTION

FIG. 1 shows a yield analysis tool infrastructure that exists in an integrated circuit ("IC") manufacturing or fabrication factory (a "semiconductor fab" or "fab") in accordance with the prior art. As shown in FIG. 1, mask shop 1000 produces reticle 1010. As further shown in FIG. 1, Work-in-Progress tracking system 1020 ("WIP tracking system 1020") tracks wafers as they progress through various processing steps in the fab that are used to fabricate (and test) ICs on a wafer or a substrate (the terms wafer and substrate are used interchangeably to refer to semiconductor wafers, or substrates of all sorts including, for example, and without limitation, glass substrates). For example, and without limitation, WIP tracking system 1020 tracks wafers through: implant tools 1030; diffusion, oxidation, deposition tools 1040; chemical mechanical planarization tools 1050 ("CMP tools 1050"); resist coating tools 1060 (for example, and without limitation, tools for coating photoresist); stepper tools 1070; developer tools 1080; etch/clean tools 1090; laser test tools 1100; parametric test tools 1110; wafer sort tools 1120; and final test tools 1130. These tools represent most of the tools that are used in the fab to produce ICs. However, this enumeration is meant to be illustrative, and not exhaustive.

As further shown in FIG. 1, a fab includes a number of systems for obtaining tool level measurements, and for automating various processes. For example, as shown in FIG. 1, tool level measurement and automation systems include tool databases 1210 to enable tool level measurement and automation tasks such as, for example, process tool management (for example, process recipe management), and tool sensor measurement data collection and analysis. For example, and without limitation, illustratively, PC server 1230 downloads process recipe data to tools (through recipe module 1233), and receives tool sensor measurement data from tool sensors (from sensors module 1235), which process recipe data and tool sensor measurement data are stored, for example, in tool databases 1210.

As further shown in FIG. 1, the fab includes a number of process measurement tools. For example, defect measurement tools 1260 and 1261; reticle defect measurement tool 1265; overlay defect measurement tool 1267; defect review tool 1270 ("DRT 1270"); CD measurement tool 1280 ("critical dimension measurement tool 1280"); and voltage contrast measurement tool 1290, which process measurement tools are driven by process evaluation tool 1300.

As further shown in FIG. 1, application specific analysis tools drive certain process measurement tools. For example, defect manager tool 1310 analyzes data produced by defect measurement tools 1260 and 1261; reticle analysis tool 1320 analyzes data produced by reticle defect measurement tool 1265; overlay analysis tool 1330 analyzes data produced by overlay defect measurement tool 1267; CD analysis tool 1340 analyzes data produced by CD measurement tool 1280, and testware tool 1350 analyzes data produced by laser test tools 1100, parametric test tools 1110, wafer sort tools 1120, and final test tools 1130.

As further shown in FIG. 1, database tracking/correlation tools obtain data from one or more of the application specific analysis tools over a communications network. For example, statistical analysis tools 1400 obtain data from, for example, defect manager tool 1310, CD analysis tool 1340, and testware tool 1350, and stores the data in relational database 1410.

Finally, yield management methodologies are applied to data stored in data extraction database 1420, which data is extracted from WIP tracking system 1020, and tool databases 1210 over the communications network.

Yield management systems used in the fab in the prior art suffer from many problems. FIG. 2 illustrates a prior art process that is utilized in the fab, which prior process is referred to herein as end-of-line monitoring. End-of-line monitoring is a process that utilizes a "trailing indicators" feedback loop. For example, as shown at box 2000 of FIG. 2, trailing indicators such as, for example, and without limitation, low yield, poor quality, and/or slow speed of devices are identified. Then, at box 2010, "bad lot" metrics (i.e., measurements related to wafer lots that produced the trailing indicators) are compared to specifications for the metrics. If the metrics are "out of spec," processing continues at box 2030 where an action is taken on an "out-of-spec" event, and feedback is provided to process control engineers to correct the "out-of-spec" condition. If, on the other hand, the metrics are "in-spec," processing continues at box 2020 where plant knowledge of past history for failures is analyzed. If this is a previously identified problem, processing continues at box 2040, otherwise (i.e., there is no prior knowledge), processing continues at box 2050. At box 2040, actions are taken in light of lot or tool comments regarding a previously identified problem, and feedback is provided to the process control engineers to take the same type of action that was previously taken. As shown at box 2050, a failure correlation is made to tool or device process historical data. If a correlation is found, processing continues at box 2060, otherwise, if no correlation is found, processing continues at box 2070. At box 2060, the "bad" tool or device process is "fixed," and feedback is provided to the process control engineers. At box 2070, a factory maintenance job is performed.

There are several problems associated with the above-described end-of-line monitoring process. For example: (a) low yield is often produced by several problems; (b) "spec" limits are often set as a result of unconfirmed theories; (c) knowledge of past product failure history is often not documented or, if it is documented, the documentation is not widely distributed; (d) data and data access is fragmented; and (e) a working hypothesis must be generated prior to performing a correlation analysis, the number of correlations is very large, and resources used to perform the correlation analysis is limited.

For example, a typical engineering process of data feed back and problem fixing typically entails the following steps: (a) define the problem (a typical time for this to occur is about 1 day); (b) select key analysis variables such as, for example, percentage of yield, percentage of defects, and so forth (a typical time for this to occur is about 1 day); (c) form an hypothesis regarding selected key analysis variable anomalies (a typical time for this to occur is about 1 day); (d) rank hypotheses using various "gut feel" methods (a typical time for this to occur is about 1 day); (e) develop experimental strategies and an experimental test plan (a typical time for this to occur is about 1 day); (f) run the experiments and collect data (a typical time for this to occur is about 15 days); (g) fit the model (a typical time for this to occur is about 1 day); (h) diagnose the model (a typical time for this to occur is about 1 day); (i) interpret the model (a typical time for this to occur is about 1 day); and (j) run confirmation tests to verify an improvement (a typical time for this to occur is about 20 days), or if there is no improvement, run the next experiment starting at (c), typically involving five (5) iterations. As a result, a typical time to fix a problem is about seven (7) months.

As line widths shrink, and newer technology and materials are being used to manufacture ICs (for example, copper metallization, and new low-k dielectric films), reducing defectivity (be it process or contamination induced) is becoming increasingly more important. Time-to-root-cause is key to overcoming defectivity. These issues are made no easier by a transition to 300 mm wafers. Thus, with many things converging simultaneously, yield ramping is becoming a major hurdle.

In addition to the above-identified problems, a further problem arises in that semiconductor fabs spend a large amount of their capital on defect detection equipment and defect data management software in an effort to monitor defectivity, and continuously reduce defect densities. Current prior art techniques in defect data management software entail developing one or more of the following deliverables: (a) defect trends (for example, paretos by defect type and size); (b) wafer level defect versus yield charts; and (c) kill ratio on an ad hoc and manual basis by type and size. For each of these deliverables, a main drawback is that a user has to have prior knowledge of what he/she wants to plot. However, due to the magnitude of the data, the probability of the user trending a root cause is low. Moreover, even if charts were generated for every variable, given the large number of charts, it would be virtually impossible for the user to analyze every one of such charts.

In addition to the above-identified problems, a further problem arises in that much of the data utilized in the semiconductor fab is "indirect metrology data." The term "indirect metrology" in this context indicates data gathering on indirect metrics, which indirect metrics are assumed to relate in predictable ways to manufacturing process within the fab. For example, after a metal line is patterned on an IC, a critical dimension scanning electron microscope ("CD-SEM") might be used to measure a width of the metal line at a variety of locations on a given set of wafers. A business value is assigned to a metrology infrastructure within a semiconductor fab that is related to how quickly a metrology data measurement can be turned into actionable information to halt a progression of a process "gone bad" in the fab. However, in practice, indirect metrology identifies a large number of potential issues, and these issues often lack a clear relationship to specific or "actionable" fab processing tools or processing tool processing conditions. This lack of a clear relationship between the processing toolset and much of a semiconductor fab's indirect metrology results in a significant investment in engineering staffing infrastructure, and a significant "scrap" material cost due to the unpredictable timeframe required to establish causal relationships within the data.

In addition to metrology, within the last few years a large amount of capital has been spent on deploying data extraction systems designed to record operating conditions of semiconductor wafer processing tools during the time a wafer is being processed. Although temporal based, process tool data is now available for some fraction of processing tools in at least some fabs, use of the data to optimize processing tool performance relative to the ICs being produced has been limited. This is due to a disconnect between how IC performance data is represented relative to how processing tool temporal data is represented. For example, data measurements on ICs are necessarily associated with a given batch of wafers (referred to as a lot),or a given wafer, or a given subset of ICs on the wafer. On the other hand, data measurements from processing tool temporal data are represented as discrete operating conditions within the processing tool at specific times during wafer processing. For example, if a processing tool has an isolated processing chamber, then chamber pressure might be recorded each millisecond while a given wafer remains in the processing chamber. In this example, the chamber pressure data for any given wafer would be recorded as a series of 1000's of unique measurements. This data format cannot be "merged" into an analysis table with a given IC data metric because the IC data metrics are single discrete measurements. The difficulty associated with "merging" processing tool temporal data and discrete data metrics has resulted in limited use of processing tool temporal data as a means to optimize factory efficiency.

In addition to the above-identified problems, a further problem arises that involves the use of relational databases to store the data generated in a fab. Relational databases, such as, for example, and without limitation, ORACLE and SQL Server, grew out of a need to organize and reference data that has defined or assigned relationships between data elements. In use, a user (for example, a programmer) of these relational database technologies supplies a schema that pre-defines how each data element relates to any other data element. Once the database is populated, an application user of the database makes queries for information contained in the database based on the pre-established relationships. In this regard, prior art relational databases have two inherent issues that cause problems when such relational databases are used in a fab. The first issue is that a user (for example, aprogrammer) must have an intimate knowledge of the data prior to creating specific schema (i.e., relationships and database tables) for the data to be modeled. The schema implements controls that specifically safe guard the data element relationships. Software to put data into the database, and application software to retrieve data from the database, must use the schema relationship between any two elements of data in the database. The second issue is that, although relational databases have excellent TPS ratings (i.e., transaction processing specifications) for retrieving small data transactions (such as, for example, banking, airline ticketing, and so forth), they perform inadequately in generating large data sets in support of decision support systems such as data warehousing, and data mining required for, among other things, yield improvement in a fab.

In addition to the above-identified problems, a further problem arises as a result of prior art data analysis algorithms that are used in the semiconductor manufacturing industry to quantify production yield issues. Such algorithms include linear regression analysis, and manual application of decision tree data mining methods. These algorithms suffer from two basic problems: (a) there is almost always more than one yield impacting issue within a given set of data; however, these algorithms are best used to find "an" answer rather than quantify a suite of separate yield impacting issues within a given fab; and (b) these algorithms are not able to be completely automated for "hands off" analyses; i.e., linear regression analysis requires manual preparation and definition of variable categories prior to analysis, and the decision tree data mining requires a "human user" to define a targeted variable within the analysis as well as to define various parameters for the analysis itself.

In addition to the above-identified problems, a further problem arises in data mining significantly large data sets. For example, in accordance with prior art techniques, data mining significantly large data sets has been possible only after utilizing some level of domain knowledge (i.e., information relating to, for example, what fields in a stream of data represent "interesting" information) to filter the data set to reduce the size and number of variables within the data to be analyzed. Once this reduced data set is produced, it is mined against a known analysis technique/model by having experts define a value system (i.e., a definition of what is important), and then guess at "good questions" that should drive the analysis system. For this methodology to be effective, the tools are typically manually configured, and manipulated by people who will ultimately evaluate the results. These people are usually the same people responsible for the process being evaluated, since it is their industry expertise (and more precisely, their knowledge of the particular processes) that is needed to collect the data and to form proper questions used to mine the data set. Burdening these industry experts with the required data mining and correlation tasks introduces inefficiencies in use of their time, as well as inconsistencies in results obtained from process to process, since the process of data mining is largely driven by manual intervention. Ultimately, even when successful, much of the "gains" have been lost or diminished. For example, the time consuming process of manually manipulating the data and analysis is costly, in man hours and equipment, and if the results are not achieved early enough, there is not enough time to implement discovered changes.

In addition to the above-identified problems, a further problem arises in as follows. An important part of yield enhancement and factory efficiency improvement monitoring efforts are focused on correlations between end-of-line functional test data, inline parametric data, inline metrology data, and specific factory process tools used to fabricate ICs. In carrying out such correlations, it is necessary to determine a relationship between a specified "numeric column of data" relative to all of the columns of factory processing tool data (which processing tool data are pre-presented as categorical attributes). A good correlation is defined by a specific column of processing tool (i.e., categorical) data having one of the categories within the column correlate to an undesirable range of values for a chosen numeric column (i.e., referred to as a Dependent Variable or "DV"). The goal of such an analysis is to identify a category (for example, a factory process tool) suspected of causing undesirable DV readings, and to remove it from the fab processing flow until such time as engineers can be sure the processing tool is operating correctly. Given the vast number of tools and "tool-like" categorical data within semiconductor fab databases, it is difficult to isolate a rogue processing tool using manual spreadsheet searching techniques (referred to as "commonality studies"). Despite this limitation, techniques exist within the semiconductor industry to detect bad processing tools or categorical process data. For example, this may be done by performing lot commonality analysis. However, this technique requires prior knowledge of a specific process layer, and it can be time consuming if a user does not have a good understanding of the nature of the failure. Another technique is to use advanced data mining algorithms such as neural networks or decision trees. These techniques can be effective, but extensive domain expertise required in data mining makes them difficult to set up. In addition, these data mining algorithms are known to be slow due to the large amount of algorithm overhead required with such generic data analysis techniques. With the above-mentioned analysis techniques, the user typically spends more time trying to identify a problem via a rudimentary or complex analysis than spending effort contributing to actual fixing of the bad processing tool after it is found.

Lastly, in addition to the above-identified problems, a further problem arises as follows. Data mining algorithms such as neural networks, rule induction searches, and decision trees are often more desirable methodologies when compared to ordinary linear statistics, as pertains to searching for correlations within large datasets. However, when utilizing these algorithms to analyze large data sets on low cost hardware platforms such as Window 2000 servers, several limitations occur. Of primary concern among these limitations is the utilization of random access memory and extended CPU loading required by these techniques. Often, a neural network analysis of a large semiconductor manufacturing dataset (for example, >40 Mbytes) will persist over several hours, and may even breach the 2 Gbyte RAM limit for the Windows 2000 operating system. In addition, rule induction or decision tree analysis on these large datasets, while not necessarily breaching the RAM limit for a single Windows process, may still persist for several hours prior to the analysis' being complete.

There is a need in the art to solve one or more of the above-described problems.

SUMMARY OF THE INVENTION

One or more embodiments of the present invention advantageously satisfy the above-identified need in the art. Specifically, one embodiment of the present invention is a method for data mining information obtained in an integrated circuit fabrication factory ("fab") that includes steps of: (a) gathering data from the fab from one or more of systems, tools, and databases that produce data in the fab or collect data from the fab; (b) formatting the data and storing the formatted data in a source database; (c) extracting portions of the data for use in data mining in accordance with a user specified configuration file; (d) data mining the extracted portions of data in response to a user specified analysis configuration file; (e) storing results of data mining in a results database; and (f) providing access to the results.

BRIEF DESCRIPTION OF THE FIGURE

FIG. 10 shows distributive queuing carried out by a DataBrainCmdCenter application in accordance with one or more embodiments of the present invention;

FIG. 11 shows an Analysis Template User Interface portion of a User Edit and Configuration File Interface module that is fabricated in accordance with one or more embodiments of the present invention;

FIG. 12 shows an Analysis Template portion a Configuration File that is fabricated in accordance with one or more embodiments of the present invention;

FIG. 21 shows an example of a subset of a data matrix that is input to a DataBrain module;

FIG. 23 shows the use of a scoring threshold for three tools;

FIG. 24 shows an example of a defect data file coming out of defect inspection tools or defect review tools in a fab;

FIG. 25 shows an example of a data matrix created by the data translation algorithm.

DETAILED DESCRIPTION

One or more embodiments of the present invention enable, among other things, yield enhancement by providing one or more of the following: (a) an integrated circuit ("IC") manufacturing factory (a "semiconductor fab" or "fab") data feed, i.e., by establishing multi-format data file streaming; (b) a database that indexes tens of thousands of measurements, such as, for example, and without limitation, a hybrid database that indexes tens of thousands of measurements in, for example, and without limitation, an Oracle file system; (c) a decision analysis data feed with rapid export of multiple data sets for analysis; (d) unassisted analysis automation with automated question asking using a "data value system"; (e) multiple data mining techniques such as, for example, and without limitation, neural networks, rule induction, and multi-variant statistics; (f) visualization tools with a multiplicity of follow-on statistics to qualify findings; and (g) an application service provider ("ASP") for an end-to-end web delivery system to provide rapid deployment. Using one or more such embodiments of the present invention, a typical engineering process of data feed back and problem fixing typically will entail the following steps: (a) automatic problem definition (a typical time for this to occur is about 0 days); (b) monitor all key analysis variables such as percentage of yield, percentage of defects, and so forth (a typical time for this to occur is about 0 days); (c) form an hypothesis regarding all key analysis variable anomalies (a typical time for this to occur is about 0 days); (d) rank hypotheses using statistical confidence level and fixability criteria (i.e., instructions provided (for example, in configuration files that may be based on experience) that indicate how to score or rate hypotheses including, for example, and without limitation, weighting for certain artificial intelligence rules—note that fixability criteria for categorical data, for example, tool data, is different from fixability criteria for numerical data, for example, probe data) (a typical time for this to occur is about 1 day); (e) develop experimental strategies and an experimental test plan (a typical time for this to occur is about 1 day);(f) run the experiments and collect data (a typical time for this to occur is about 15 days); (g) fit the model (a typical time for this to occur is about 1 day); (h) diagnose the model (a typical time for this to occur is about 1 day); (i) interpret the model (a typical time for this to occur is about 1 day); and (j) run confirmation tests to verify the improvement (a typical time for this to occur is about 20 days) with no iteration. As a result, a typical time to fix a problem is about one and one-half (1.5) months.

Figure 1:
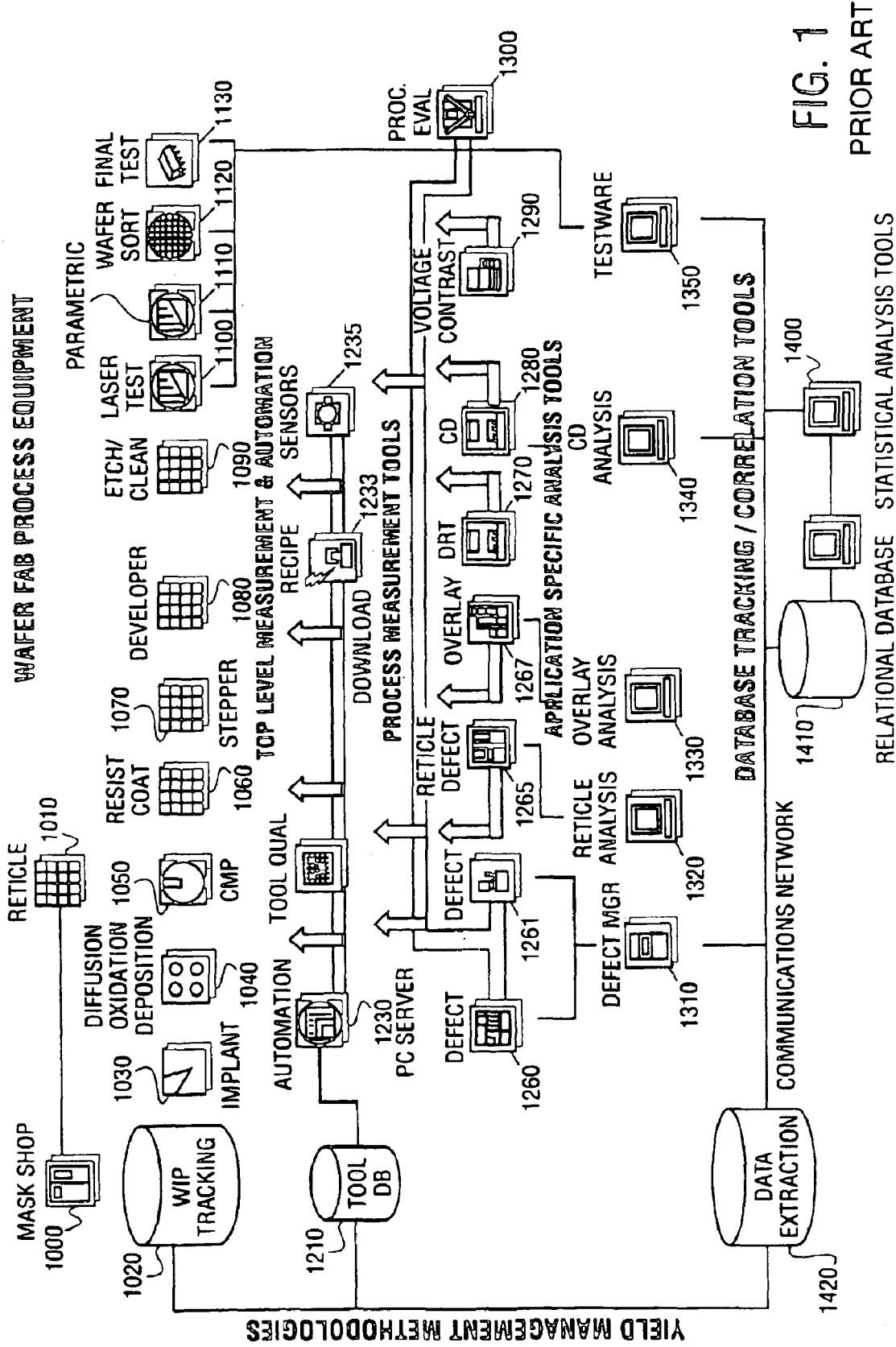
FIG. 1 shows a yield analysis tool infrastructure that exists in a integrated circuit ("IC") manufacturing or fabrication factory (a "semiconductor fab" or "fab") in accordance with the prior art.
Figure 2:
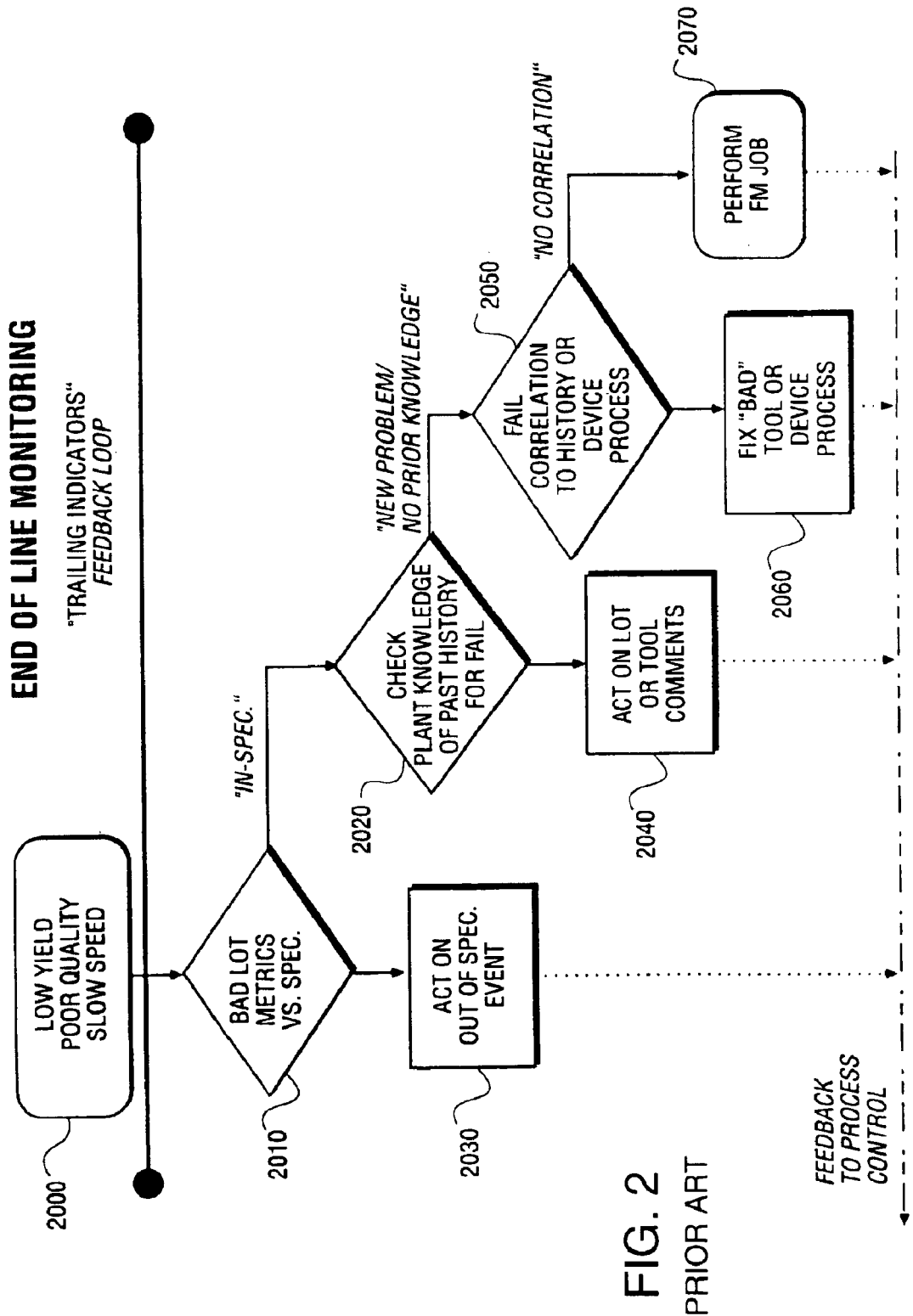
FIG. 2 shows a prior art process that is utilized in the fab, which prior process is referred herein to as end-of-line monitoring.
Figure 3:
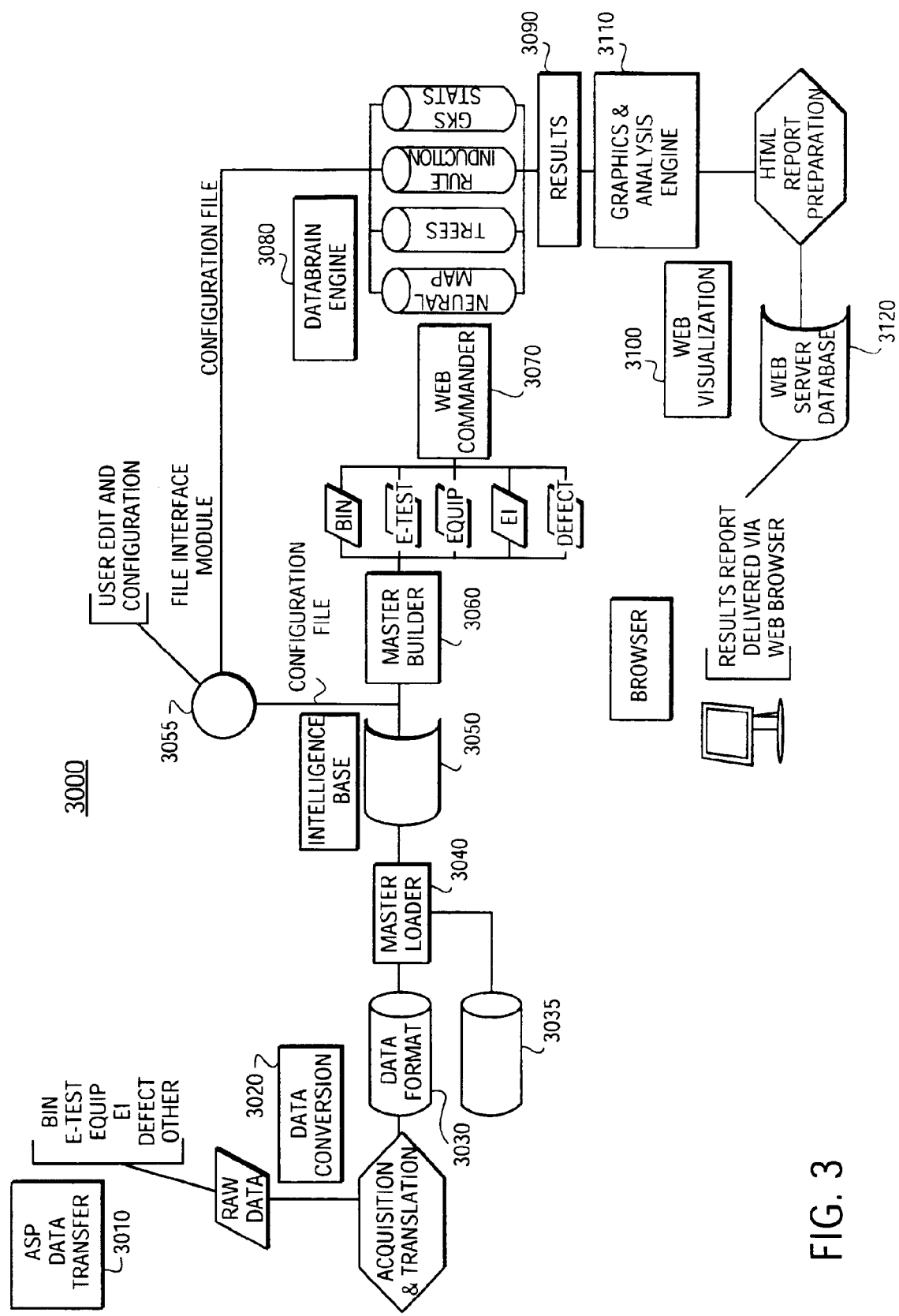
FIG. 3 shows a Fab Data Analysis system that is fabricated in accordance with one or more embodiments of the present invention, and an automated flow of data from raw unformatted input to data mining results as it applies to one or more embodiments of the present invention for use with an IC manufacturing process.

FIG. 3 shows Fab Data Analysis system 3000 that is fabricated in accordance with one or more embodiments of the present invention, and an automated flow of data from raw unformatted input to data mining results as it applies to one or more embodiments of the present invention for use with an IC manufacturing process. In accordance with one or more such embodiments of the present invention, the shortcomings of manually data mining a process, and turning the results of data mining into process improvements can be greatly reduced, or eliminated, by automating each step in an analysis process, and flow from one phase of the analysis process to the next. In addition, in accordance with one or more further embodiments of the present invention, user or client access is provided to data analysis setup, and results viewing is made available via a commonly available, already installed interface such as an Internet web browser. An Application Service Provider ("ASP") system distribution methodology (i.e., a web-based data transfer methodology that is well known to those of ordinary skill in the art)

is a preferred methodology for implementing such a web browser interface. As such, one or more embodiments of Fab Data Analysis system 3000 shown in FIG. 3 may be used by one company where data collection and analysis is performed on data from one or more fab sites, or by several companies where data collection and analysis is performed on data from one or more fab sites for each company. In addition, for one or more such embodiments, users or clients setting up and/or viewing results may be different users or clients from different parts of the same company, or different users or clients from different parts of different companies, where data is segregated according to security requirements by account administration methods.

In accordance with one or more embodiments of the present invention: (a) data is automatically retrieved, manipulated, and formatted so that data mining tools can work with it; (b) a value system is applied, and questions automatically generated, so that the data mining tools will return relevant results; and (c) the results are posted automatically, and are accessible remotely so that corrective actions in light of the results can be taken quickly.

As shown in FIG. 3, ASP Data Transfer module 3010 is a data gathering process or module that obtains different types of data from any one of a number of different types of data sources in a fab such as, for example, and without limitation: (a) Lot Equipment History data from an MES ("Management Execution System"); (b) data from an Equipment Interface data source; (c) Processing Tool Recipes and Processing Tool test programs from fab-provided data sources; and (d) raw equipment data such as, for example, and without limitation, Probe Test data, E-Test (electrical test) data, Defect Measurement data, Remote Diagnostic data collection, and Post Processing data from fab-provided data sources. In accordance with one or more embodiments of the present invention, ASP Data Transfer module 3010 accepts and/or collects data transmitted in customer-and/or tool-dictated formats from, for example, and without limitation, customer data collection databases (centralized or otherwise) that store raw data output from tools, and/or directly from sources of the data. Further, such data acceptance or collection may occur on a scheduled basis, or on demand. Still further, the data may be encrypted, and may be transmitted as FTP files over a secure network (for example, as secure e-mail) such as a customer intranet. In accordance with one embodiment of the present invention, ASP Data Transfer module 3010 is a software application that runs on a PC server, and is coded in $C^{++}$, Perl and Visual Basic in accordance with any one of a number of methods that are well known to those of ordinary skill in the art As an example, typical data that is commonly available includes: (a) WIP (work-in-progress) information that typically includes about 12,000 items/Lot (a lot of wafers typically refers to 25 wafers that usually travel together during processing in a cassette)—WIP information is typically accessed by Process Engineers; (b) Equipment Interface information, for example, raw processing tool data, that typically includes about 120,000 items/Lot—note, in the past, Equipment Interface information has typically not accessed by anyone; (c) Process Metrology information that typically includes about 1000 items/Lot—Process Metrology information is typically accessed by Process Engineers; (d) Defect information that typically includes about 1,000 items/Lot—Defect information is typically accessed by Yield Engineers; (e) E-test (Electrical test) information that typically includes about 10,000 items/Lot—E-test information is typically accessed by Device Engineers; and (f) Sort (w/Datalog and bitmap) information that typically includes about 2,000 items/Lot—Sort information is typically accessed by Product Engineers. As one can readily appreciate these data can roll up to a total of about 136,000 unique measurements per wafer.

As further shown in FIG. 3, Data Conversion module 3020 converts and/or translates the raw data received by ASP Data Transfer module 3010 into a data format that includes keys/columns/data in accordance with any one of a number of methods that are well known to those of ordinary skill in the art and the converted data is stored in Self-Adapting Database 3030. Data conversion processing carried out by Data Conversion module 3020 entails sorting the raw data; consolidation processing such as, for example, and without limitation, Fab—Test LotID conversion (for example, this is useful for foundries), WaferID conversions (for example, Sleuth and Scribe IDs), and Wafer/Reticle/Die coordinate normalization and conversion (for example, and without limitation, depending on whether a notch or a wafer fiducial measurement is used for coordinate normalization); and data specification such as, for example, and without limitation, specification limits for E-Test data, Bin probe data (for example, for certain end-of-line probe tests, there may be from 10 to 100 failure modes), Metrology data, and computed data types such as, for example, and without limitation, lot, wafer, region, and layer data. In accordance with one embodiment of the present invention, Data Conversion module 3020 is a software application that runs on a PC server, and is coded in Oracle Dynamic PL-SQL and Perl in accordance with any one of a number of methods that are well known to those of ordinary skill in the art. In accordance with one such embodiment of the present invention, data conversion processing carried out by Data Conversion module 3020 entails the use of a generic set of translators in accordance with any one of a number of methods that are well known to those of ordinary skill in the art that convert raw data files into "well formatted" industry agnostic files (i.e., the data formats are "commonized" so that only a few formats are used no matter how many data formats into which the data may be converted). In accordance with one or more embodiments of the present invention, the converted files maintain "level" information existing in the raw data (to enable subsequent processes to "roll up" lower granularity data into higher granularity data) while not containing industry specific information. Once the raw data is put into this format, it is fed into Self-Adapting Database 3030 for storage.

In accordance with one or more embodiments of the present invention, a generic file format for input data is defined by using the following leveling scheme: WidgetID, Where?, When?, What?, and Value. For example, for a semiconductor fab these are specifically defined as follows. Widget ID is identified by one or more of: LotID, WaferID, SlotID, ReticleID, DieID, and Sub-die x,y Cartesian coordinate; Where? is identified by one or more of: process flow/assembly line manufacturing step; and sub-step. When? is identified by one or more of date/time of the measurement. What? is identified as one or more of measurement name "for example, and without limitation, yield," measurement type/category, and wafer sort. Value? is defined as, for an example, and without limitation, yield, 51.4%. Using such an embodiment, any plant data can be represented.

In accordance with one or more embodiments of the present invention, Data Conversion module 3020 will generically translate a new type of data that is collected by ASP Data Transfer module 3010. In particular, Data Conversion module 3020 will create an "on-the-fly" database "handshake" to enable storage of the new data in Self-Adapting Database 3030, for example, by creating a hash code for data access. Finally, in accordance with one embodiment of the present invention, data is stored in Self-Adapting Database 3030 as it arrives at Fab Data Analysis system 3000.

In accordance with one or more embodiments of the present invention, ASP Data Transfer module 3010 includes a module that gathers processing tool sensor data from a SmartSys™ database (a SmartSys™ application is a software application available from Applied Materials, Inc. that collects, analyzes, and stores data, for example, sensor data, from processing tools in a fab). In addition, Data Conversion module 3020 includes a module that transforms SmartSys™ processing tool sensor data into data sets that are prepared by Master Loader module 3050 and Master Builder module 3060 for data mining.

In accordance with one or more embodiments of the present invention, a data translation algorithm enables use of temporal-based data from individual processing (i.e., factory or assembly-line) tools to establish a "direct" link between metrology data metrics and existing, non-optimal fab (i.e., factory conditions). An important part of this data translation algorithm is a method of translating temporal-based operating condition data generated within processing (factory or assembly-line) tools during wafer processing into key integrated circuit specific statistics that can then be analyzed in a manner that will be described below by DataBrain Engine module 3080 to provide automated data mining fault detection analysis. In accordance with one or more embodiments of the present invention, the following steps are carried out to translate such temporal-based processing tool data:

a. creating a Configuration file (using a user interface that is described below) that specifies granularity of digitization for a generic temporal-based data format; and b. translating temporal-based processing tool data received by ASP Data Transfer module 3010 from a variety of, for example, and without limitation, ASCII data, file formats into a generic temporal-based data file format using the Configuration file.

The following shows one embodiment of a definition of a format for the generic, temporal-based data file format. Advantageously, in accordance with these embodiments, it is not necessary that all data fields be complete for a file to be considered "of value." Instead, as will be described below, some data fields can be later populated by a "post processing" data filling routine that communicates with a semiconductor manufacturing execution system (MES) host.

```
<BEGINNING OF HEADER>
[PRODUCTID CODE]
[LOTID CODE]
[PARENT LOTID CODE]
[WAFERID CODE]
[SLOTID CODE]
[WIP MODULE]
[WIP SUB-MODULE]
[WIP SUB-MODULE-STEP]
[TRACKIN DATE]
[TRACKOUT DATE]
[PROCESS TOOLID]
[PROCESS TOOL RECIPE USED]
<END OF HEADER>
<BEGINNING OF DATA>
<BEGINNING OF PARAMETER>
```

```
[PARAMETER ENGLISH NAME]
[PARAMETERID NUMBER]
[DATA COLLECTION START TIME]
[DATA COLLECTION END TIME]
time increment1, data value 1
time increment2, data value 2
time increment3, data value 3
...
<END OF PARAMETER>
<BEGINNING OF PARAMETER>
[PARAMETER ENGLISH NAME]
[PARAMETERID NUMBER]
[DATA COLLECTION START TIME]
[DATA COLLECTION END TIME]
time increment1, data value 1
time increment2, data value 2
time increment3, data value 3
...
<END OF PARAMETER>
<END OF DATA>
```

In accordance with this embodiment, items set forth above in italics are needed to enable proper merging of file content with IC data metrics.

As described above, in accordance with one or more embodiments of the present invention, a Configuration file for temporal-based data translation specifies the granularity with which the temporal-based data will be represented as wafer statistics. In accordance with one such embodiment, a Configuration file may also contain some information regarding which temporal-based raw data formats are handled by that particular Configuration file, as well as one or more options regarding data archiving of the raw files. The following is an example of one embodiment of a Configuration file.

```
<BEGINNING OF HEADER>
[FILE EXTENSIONS APPLICABLE TO THIS CONFG FILE]
[RAW DATA ARCHIVE FILE <Y OR N>]
[CREATE IMAGE ARCHIVE FILES <NUMBER OF FILES / PARAMETER>]
[IMAGE ARCHIVE FILE RESOLUTION]
<END OF HEADER>
<BEGINNING OF ANALYSIS HEADER>
[GLOBAL GRAPH STATS <ON / OFF>, N SEGMENTS]
[XAXIS TIME STATS <ON / OFF>, N SEGMENTS]
[YAXIS PARAMETER STATS <ON / OFF>, N SEGMENTS]
<END OF ANALYSIS HEADER>
```

The following explains the Configuration file parameters set forth above.

File extensions: this line in the Configuration file lists file extensions and/or naming convention keywords which indicate that a given raw, generic temporal-based data file will be translated using the parameters defined within a given Configuration file.

Raw data archive file: this line in the Configuration file designates if an archived copy of the original data should be kept—using this option will result in the file being compressed, and stored in an archive directory structure.

Create image archive files: this line in the Configuration file designates if data within the raw temporal-based data file should be graphed in a standard x-y format so that an "original" view of the data can be stored and rapidly retrieved without having to archive and interactively plot the entire contents of the raw data file (these files can be large and may add up to a total of 10 to 20 G-Bytes per month for a single processing tool). The number of images option enables multiple snapshots of various key regions of the x-y data plot to be stored so that a "zoomed-in" view of the data is also available.

Image archive file resolution: this line in the Configuration file defines what level of standard image compression will be applied to any x-y graphs captured by the create image archive files option.

Global graph stats: this line in the Configuration file designates that the system will generate global statistics for all of the file formats handled by the Configuration file in question, a description of how these statistics are generated is described below.

X-axis time graph stats: this line in the Configuration file indicates that the system will generate X-axis time range defined statistics for all of file formats handled by the Configuration file in question, a description of how these statistics are generated is set forth below.

Percent data graph stats: this line in the Configuration file designates that the system will generate Percent data statistics for all of file formats handled by the Configuration file in question, a description of how these statistics are generated is set forth below.

Figure 5:
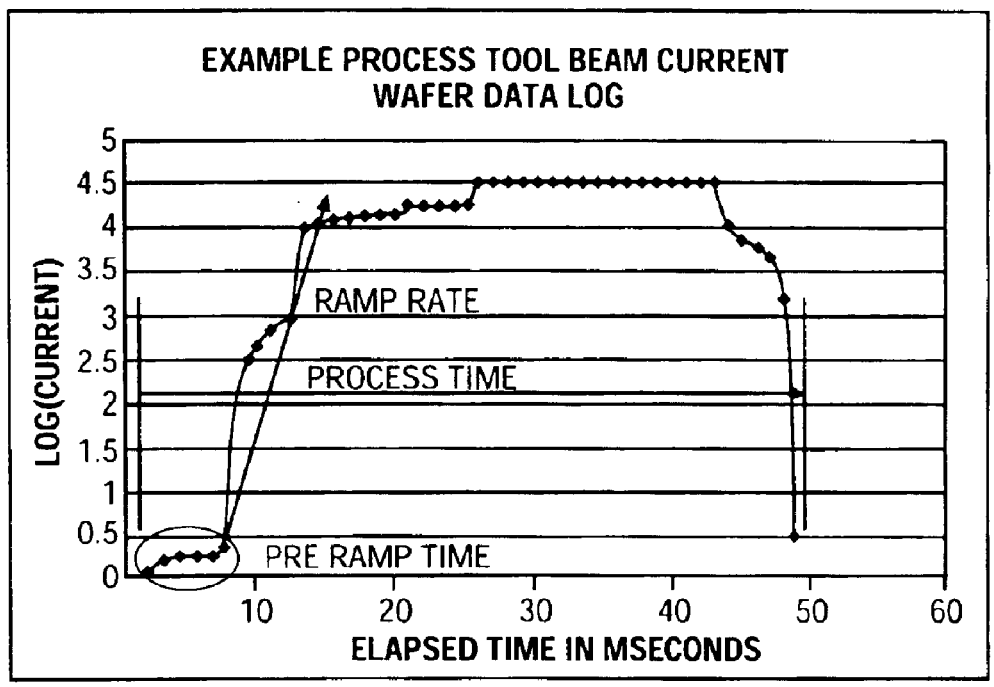
FIG. 5 shows an example of raw temporal-based data, and in particular, a graph of Process Tool Beam Current as a function of time.
Figure 6:
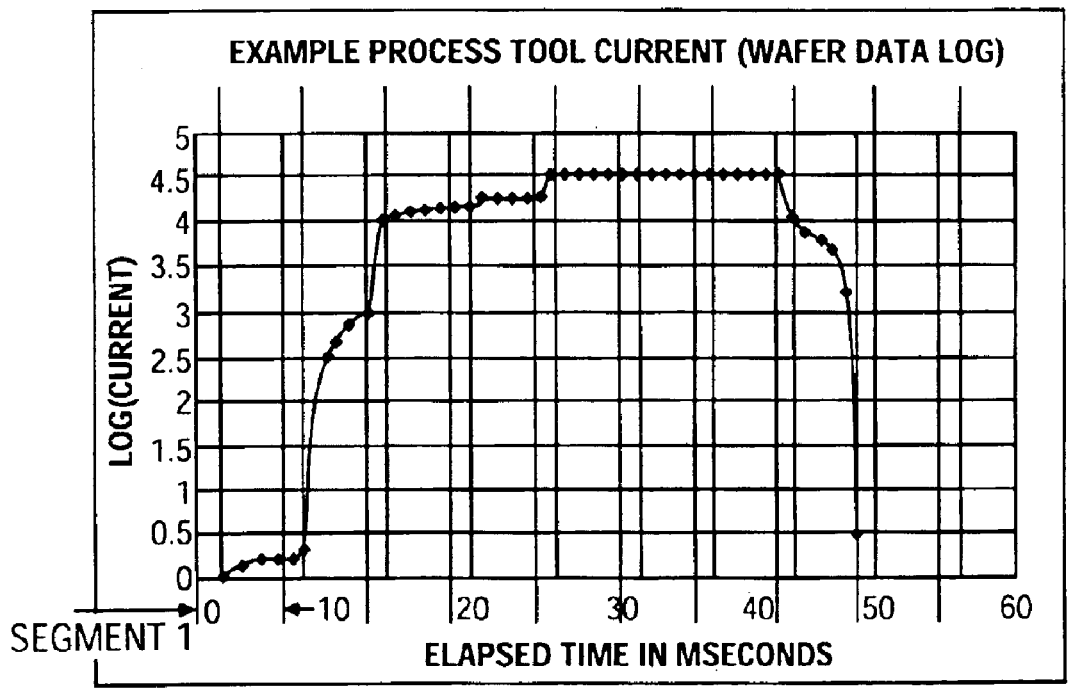
FIG. 6 shows how the raw temporal-based data shown in FIG. 5 is broken down into segments.
Figure 7:
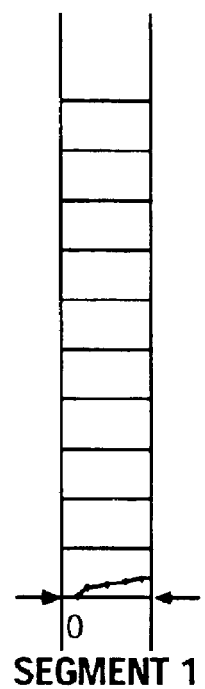
FIG. 7 shows the raw temporal-based data associated with segment 1 of FIG. 6.

In accordance with one or more of such embodiments of the present invention, the following statistics, also referred to as X-axis time graph statistics are generated for each temporal-based data graph, on a parameter by parameter basis. For example, for a given temporal-based data set and a given parameter, the data is divided into a number of segments as defined within the Configuration file. The X-axis time graph segments are defined by taking the entire width of the x-axis (from smallest x value to largest x value), and dividing it into N many equal increments of x-axis range. For each segment statistics are generated and recorded. To understand how this works, first refer to FIG. 5 which shows an example of raw temporal-based data, and in particular, a graph of Process Tool Beam Current as a function of time. FIG. 6 shows how the raw temporal-based data shown in FIG. 5 is broken down into segments, and FIG. 7 shows the raw temporal-based data associated with segment 1 of FIG. 6.

Figure 8:
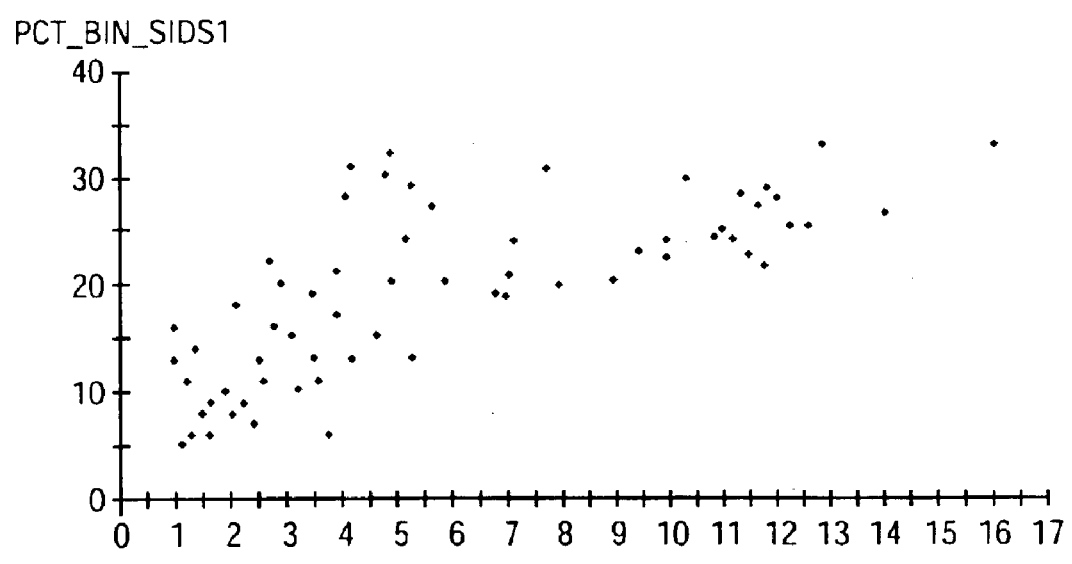
FIG. 8 shows an example of the dependence of Y-Range within Segment 7 on BIN_S.

The following are typical segment statistics (for an example, of N many segments, with 10 statistics for each segment):

1. Area within the segment
2. Mean Y axis values of data in the segment
3. Standard Deviation of the Y axis values of data within the segment
4. Slope of the segment
5. Minimum Y axis value of the segment
6. Maximum Y axis value of the segment
7. Percent change in Y axis mean value from previous segment
8. Percent change in Y axis mean value from the next segment
9. Percent change in Y axis standard deviation value from previous segment
10. Percent change in Y axis standard deviation value from the next segment FIG. 8 shows an example of the dependence of Y-Range within Segment 7 on BIN_S. By using the above information, a process engineer could tune the recipe (processing tool settings) within the processing tool to have a range corresponding to a lower BIN_S fail.

In accordance with one embodiment of the present invention, the following 29 statistics are global statistics that are calculated from the data with no Tukey data cleaning.

1. Total Area under the curve
2. Number of 10% or greater Y-axis slope changes
3. X-axis 95% data width (i.e., start at the middle of the data, and go left and right to pick up 95% of the data)
4. Y-axis mean of the 95% X-axis data width
5. Y-axis standard deviation of the 95% X-axis data width
6. Y-axis range of the 95% X-axis data width
7. X axis 95% area under the curve
8. X axis Left most 2.5% data width
9. X axis Left most 2.5% area under the curve
10. X axis Right most 2.5% data width
11. X axis Right most 2.5% area under the curve
12. X axis 90% data width (start at the middle of the data and go left and right to pick up 90%)
13. Y-axis mean of the 90% X-axis data width
14. Y-axis standard deviation of the 90% X-axis data width
15. Y-axis range of the 90% X-axis data width
16. X axis 90% area under the curve
17. X axis Left most 5% data width
18. X axis Left most 5% area under the curve
19. X axis Right most 5% data width
20. X axis Right most 5% area under the curve
21. X axis 75% data width (start at the middle of the data go left and right to pick up 75%)
22. Y-axis mean of 75% X-axis data width
23. Y-axis standard deviation of 75% X-axis data width
24. Y-axis range of 75% X-axis data width
25. X axis 75% area under the curve
26. X axis Left most 12.5% data width
27. X axis Left most 12.5% area under the curve
28. X axis Right most 12.5% data width
29. X axis Right most 12.5% area under the curve Although the percentages used in the above embodiment are common percentages, 90, 95, 75 etc., further embodiments exist wherein these percentages may be modified to intermediate values, for example, as it becomes of interest to refine the scope of the "heart" of the data to be more or less wide.

Further embodiments exist wherein global statistics like those above are calculated with 5000% Tukey data cleaning, and still embodiments exist wherein global statistics like those above are calculated with 500% Tukey data cleaning.

In accordance with one embodiment of the present invention, percent data statistics are the same as the 10 statistics listed above for X-axis time graph statistics. The difference between percent data and X-axis time statistics is the way in which the segments are defined. For X-axis time statistics, the segments are based upon N equal parts of the X-axis. However, for percent data statistics, the segments width on the X-axis varies since the segments are defined by the percentage of data contained within the segment. For example, if percent data segmentation is turned "on" with 10 segments, then the first segment would be the first 10% of the data (left most 10% of data points using the X-axis as a reference).

As further shown in FIG. 3, Master Loader module 3040 (whether triggered by time generated events or data arrival events) retrieves formatted data from Self-Adapting Database 3030 (for example, data file 3035), and converts it into Intelligence Base 3050. In accordance with one embodiment of the present invention, Intelligence Base 3050 is embodied as an Oracle relational database that is well known to those of ordinary skill in the art. In accordance with a further embodiment of the present invention, Master Loader module 3040 polls directories in Self-Adapting Database 3030 as data "trickles" in from the fab to determine whether a sufficient amount of data has arrived to be retrieved and transferred to Intelligence Base 3050.

In accordance with one or more embodiments of the present invention, Master Loader module 3040 and Intelligence Base 3050 comprise a method and apparatus for managing, referencing, and extracting large quantities of unstructured, relational data. In accordance with one or more embodiments of the present invention, Intelligence Base 3050 is a hybrid database that comprises an Intelligence Base relational database component, and an Intelligence Base file system component. In accordance with one such embodiment, the relational database component (for example, a schema) uses a hash-index algorithm to create access keys to discrete data stored in a distributed file base. Advantageously, this enables rapid conversion of unstructured raw data into a formal structure, thereby bypassing limitations of commercial database products, and taking advantage of the speed provided by storage of structured files in disk arrays.

In accordance with one embodiment of the present invention, a first step of design setup for Intelligence Base 3050 involves defining applicable levels of discrete data measurements that may exist. However, in accordance with one or more such embodiments of the present invention, it is not required to anticipate how many levels of a given discrete data exist in order to begin the process of building Intelligence Base 3050 for that discrete data. Instead, it is only required that relationships of new levels (either sub-levels or super-levels) to earlier levels be defined at some point within Intelligence Base 3050. To understand this, consider the following example. Within a fab, a common level might be a collection of wafers; this could be indexed as level 1 within Intelligence Base 3050. Next, each specific wafer within the collection of wafers could be indexed as level 2. Next, any specific sub-grouping of chips on the wafers could be indexed as level 3 (or as multiple levels, depending on the consistency of the sub-grouping categories). Advantageously, such flexibility of Intelligence Base 3050 enables any given data type to be stored within Intelligence Base 3050 as long as its properties can be indexed to the lowest level of granularity existing that applies to that data type.

Advantageously, in accordance with one or more embodiments of the present invention, a data loading process for Intelligence Base 3050 is easier than a data loading process for a traditional relational database since, for Intelligence Base 3050, each new data type must only be rewritten in a format showing a relationship between discrete manufacturing levels and data measurements (or data history) for that specific level's ID. For example, in a fab, a given data file must be re-written into lines containing a "level1" ID, a "level2" ID, and so forth, and then the measurements recorded for that collection of wafers' combination. It is this property of Intelligence Base 3050 that enables any applicable data to be loaded without defining a specific relational database schema.

Advantageously, in accordance with one or more embodiments of the present invention, Intelligence Base 3050 is designed to output large datasets in support of automated data analysis jobs (to be described in detail below) by utilizing a hash-join algorithm to rapidly accumulate and join large volumes of data. Such output of large data sets in traditional relational database designs usually requires large "table-joins" (accumulate and output data) within the database. As is well known, the use of relational database table-joins causes the process of outputting such large data sets to be very CPU intensive, and advantageously, this is not the case for the "hash-join" algorithm used to output large data sets from Intelligence Base 3050.

Figure 4:
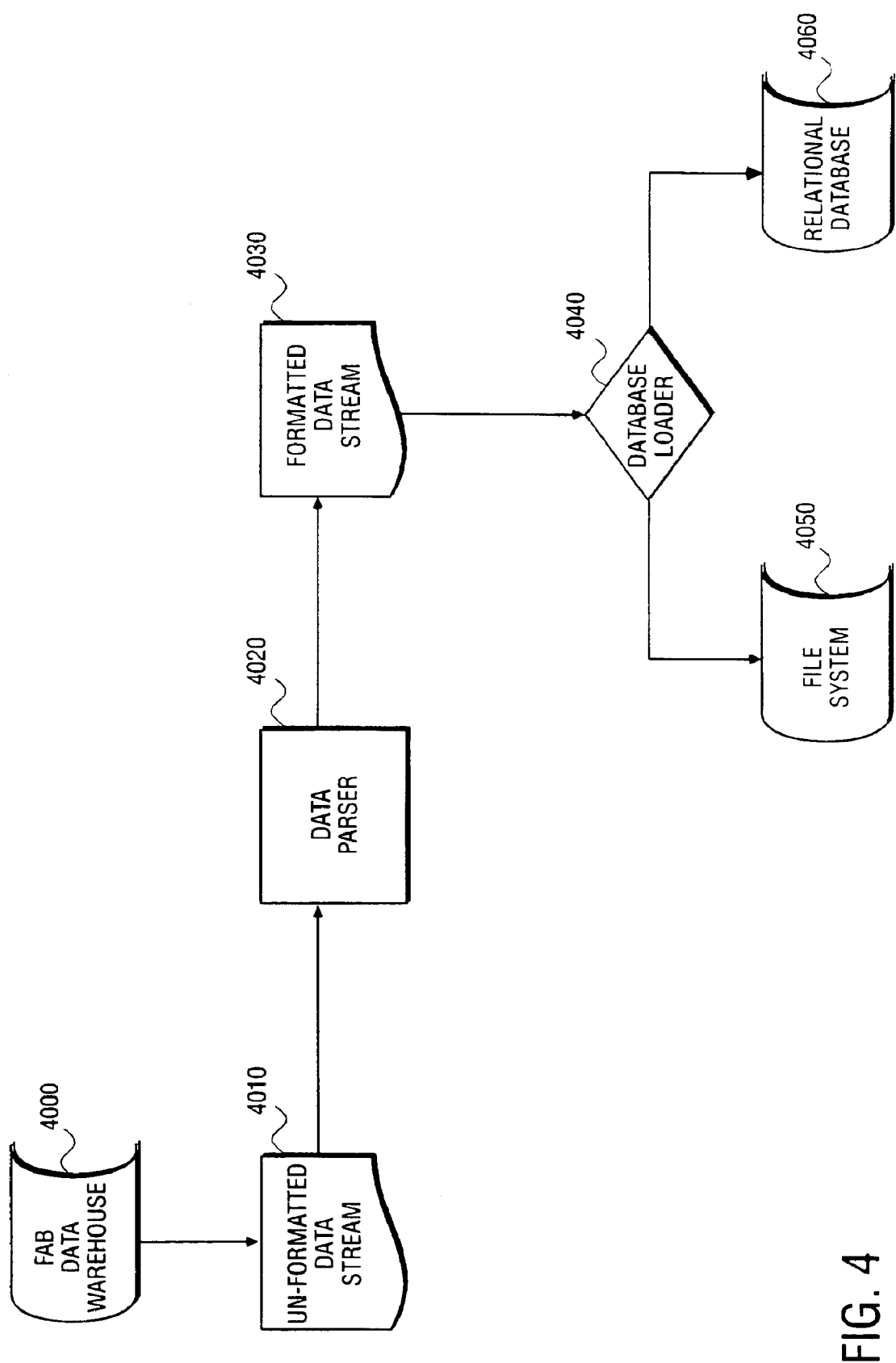
FIG. 4 shows logical data flow of a method for structuring an unstructured data event into an Intelligence Base in accordance with one or more embodiments of the present invention.

FIG. 4 illustrates a logical data flow of a method for structuring an unstructured data event into Intelligence Base 3050 in accordance with one embodiment of the present invention. As shown in FIG. 4, at box 4010, fab data is retrieved from fab data warehouse 4000. This fab data may be in any one of many different forms, and may have originated from any one of many different sources, including, without limitation, historical data from databases, and real time data from process tool monitoring equipment such as, for example, and without limitation, sensors. Next, the unformatted data is fed to data parser 4020. It should be understood that the manner and frequency at which the data is retrieved from fab warehouse 4000 does not affect the behavior of data parser 4020, database loader 4040, or Intelligence Base 3050. Next, data parser 4020 outputs formatted data stream 4030 wherein the formatted data is in a format that is acceptable by database loader 4040 (this is a format issue only, and does not introduce any "knowledge" about the data, i.e., only how the data is laid out). Next, database loader 4040 reads formatted data stream 4030. Database loader 4040 uses a hash-index algorithm to generate index keys between data elements and their location in file system 4050 (for example, and without limitation, the hash-index algorithm utilizes data level IDs of the data elements to generate the index keys). Next, the data is stored in file system 4050 for future reference and use, and the hash-index keys that reference file system 4050 are stored in relational database 4060. In one or more alternative embodiments of the present invention, Intelligence Base 3050 is created by load the data into tables partitioned and indexed by levels in an Oracle 9*i* data mart.

Returning now to FIG. 3, Master Builder module 3060 accesses Intelligence Base 3050 and uses a Configuration File (generated using User Edit and Configuration File Interface module 3055) to build data structures for use as input to data mining procedures (to be described below). User Edit and Configuration File Interface module 3055 enables a user to create a Configuration File of configuration data that is used by Master Builder 3050. For example, Master Builder 3050 obtains data from Intelligence Base 3050 specified by the Configuration File (for example, and without limitation, data of a particular type in a particular range of parameter values), and combines it with other data from Intelligence Base 3050 specified by the Configuration File (for example, and without limitation, data of another particular type in another particular range of values). To do this, the Intelligence Base file system component of Intelligence Base 3050 is referenced by the Intelligence Base relational database component of Intelligence Base 3050 to enable different data levels to be merged quickly into a "vector cache" of information that will be turned into data for use in data mining. The Configuration File enables users to define new relationships using the hash-index, thereby creating new "vector caches" of information that will then be turned into data for use in data mining in the manner to be described below (which data will be referred to herein as "hypercubes"). In accordance with one or more embodiments of the present invention, Master Builder module 3060 is a software application that runs on a PC server, and is coded in Oracle Dynamic PL-SQL and Perl in accordance with any one of a number of methods that are well known to those of ordinary skill in the art.

In operation, Master Builder module 3060 receives and/or extracts a hypercube definition using the Configuration File. Next, Master Builder module 3060 uses the hypercube definition to create a vector cache definition. Next, Master Builder module 3060 creates a vector cache of information in accordance with the vector cache definition by: (a) retrieving a list of files and data elements identified or specified by the vector cache definition from the Intelligence Base relational database component of Intelligence Base 3050 using hash-index keys; (b) retrieving the file base files from the Intelligence Base file system component of Intelligence Base 3050; and (c) populating the vector cache with data elements identified in the vector cache definition. Next, Master Builder module 3060 generates the hypercubes from the vector cache information using the hypercube definition in a manner to described below, which hypercubes are assigned an ID for use in identifying analysis results as they progress through Fab Data Analysis system 3000, and for use by clients in reviewing the analysis results. Master Builder module 3060 includes sub-modules that build hypercubes, clean hypercube data to remove data that would adversely affect data mining results in accordance with any one of a number of methods that are well known to those of ordinary skill in the art, join hypercubes to enable analysis of many different variables, and translate Bin and Parametric data into a form for use in data mining (for example, and without limitation, by converting event-driven data into binned data).

In accordance with one or more embodiments of the present invention, Master Builder module 3060 includes data cleaners or scrubers (for example, Perl and C++ software applications that are fabricated in accordance with any one of a number of methods that are well known to those of ordinary skill in the art), which data cleaning may be performed in accordance with criteria set forth in the Configuration File, or on an ad hoc basis upon receipt of user input In accordance with one or more embodiments of the present invention, Master Builder module 3060 includes a module that exports spreadsheets to users in various file formats, for example, and without limitation, SAS (a database tool that is well known to those of ordinary skill in the art), .jmp (JUMP plots are well known to those of ordinary skill in the art for use in visualizing and analyzing x-y data), .xls (a Microsoft Excel spreadsheet that is well known to those of ordinary skill in the art), and .txt (a text file format that is well known to those of ordinary skill in the art). In accordance with one or more embodiments of the present invention, Master Builder module 3060 includes a module that receives, as input, user generated hypercubes, and transfers the vector caches to DataBrain Engine module 3080 for analysis.

In accordance with one or more embodiments of the present invention, Data Conversion module 3020, Master Loader module 3040, and Master Builder module 3050 operate to provide continuous update of Self-Adapting Database 3030, Intelligence Base 3050, and data output for data mining, respectively.

As further shown in FIG. 3, WEB Commander module 3070 transfers data output from Master Builder module 3060 to DataBrain Engine module 3080 for analysis. Once a data set file formatted by Master Builder module 3060 is available for data mining, an automated data mining process analyzes the data set against an Analysis Template—looking to maximize or minimize variables designated as relevant in the Analysis Template, while also considering the relatively important magnitudes of those variables. DataBrain Engine module 3080 includes User Edit and Configuration File Interface module 3055 which contains an Analysis Configuration Setup and Template Builder module that provides a user interface to build user-defined, configuration parameter value, data mining automation files for use with DataBrain Engine module 3080. Then, DataBrain Engine module 3080 carries out the automated data mining process by using a combination of statistical properties of the variables, and the variables' relative contributions within a self-learning neural network. The statistical distribution and magnitude of a given defined "important" variable (per analysis template) or, for example, and without limitation, that variable's contribution to the structure of a Self Organizing Neural Network Map ("SOM"), automatically generates a basis upon which relevant questions can be formed, and then presented to a wide range of data mining algorithms best suited to handle the particular type of a given dataset.

In accordance with one or more embodiments of the present invention, DataBrain Engine module 3080 provides flexible, automated, iterative data mining in large unknown data sets by exploring statistical comparisons in an unknown data set to provide "hands off" operation. Such algorithm flexibility is particularly useful in exploring processes where data is comprised of numerical and categorical attributes. Algorithm examples necessary to fully explore such data include, for example, and without limitation, specialized analysis of variance (ANOVA) techniques capable of interrelating categorical and numerical data. Additionally, more than one algorithm is typically required to fully explore statistical comparisons in such data. Such data can be found in modern discrete manufacturing processes like semiconductor manufacturing, circuit board assembly, or flat panel display manufacturing.

DataBrain Engine module 3080 includes a data mining software application (referred to herein as a DataBrainCmdCenter application) that uses an Analysis Template contained in the Configuration File and data sets to perform data mining analysis. In accordance with one or more embodiments of the present invention, the DataBrainCmdCenter application invokes a DataBrain module to use one or more of the following data mining algorithms: SOM (a data mining algorithm that is well known to those of ordinary skill in the art); Rules Induction ("RI", a data mining algorithm that is well known to those of ordinary skill in the art); MahaCu (a data mining algorithm that correlates numerical data to categorical or attributes data (for example, and without limitation, processing tool ID) that will be described below); Reverse MahaCu (a data mining algorithm that correlates categorical or attributes data (for example, and without limitation, processing tool ID) to numerical data that will be described below); MultilevelAnalysis Automation wherein data mining is performed using SOM, and where output from SOM is used to carry out data mining using: (a) RI; and (b)MahaCu; Pigin (an inventive data mining algorithm that is described below); DefectBrain (an inventive data mining algorithm that is described in detail below); and Selden (a predictive model data mining algorithm that is well known to those of ordinary skill in the art).

In accordance with one or more embodiments of the present invention, the DataBrainCmdCenter application uses a central control application that enables the use of multiple data mining algorithms and statistical methods. In particular, in accordance with one or more such embodiments, the central control application enables results from one data mining analysis to feed inputs of subsequent branched analyses or runs. As a result, the DataBrainCmdCenter application enables unbounded data exploration with no limits to the number or type of analysis iterations by providing an automated and flexible mechanism for exploring data with the logic and depth of analysis governed by user-configurable system configuration files.

In its most general form, Fab Data Analysis system 3000 analyzes data received from a multiplicity of fabs, not all of which are owned or controlled by the same legal entity. As a result, different data sets may be analyzed at the same time in parallel data mining analysis runs, and reported to different users. In addition, even when the data received is obtained from a single fab (i.e., a fab that is owned or, controlled by a single legal entity), different data sets may be analyzed by different groups within the legal entity at the same time in parallel data mining analysis runs. In such cases, such data mining analysis runs are efficiently carried out, in parallel, on server farms. In accordance with one or more such embodiments of the present invention, DataBrain Engine module 3080 acts as an automation command center and includes the following components: (a) a DataBrainCmdCenter application (a branched analysis decision and control application) that invokes the DataBrain module, and that further includes: (i) a DataBrainCmdCenter Queue Manager (fabricated in accordance with any one of a number of methods that are well known to those of ordinary skill in the art) that comprises a set of distributed slave queues in a server farm, one of which is configured as the master queue; (ii) a DataBrainCmdCenter Load Balancer application (fabricated in accordance with any one of a number of methods that are well known to those of ordinary skill in the art) that balances distribution and job load in the server farm; and (iii) a DataBrainCmdCenter Account Manager application (fabricated in accordance with any one of a number of methods that are well known to those of ordinary skill in the art) that enables creation, management and status monitoring of customer accounts and associated analysis results; and (b) User Edit and Configuration File Interface module 3055 (fabricated in accordance with any one of a number of methods that are well known to those of ordinary skill in the art) that enables a user to provide Analysis Template information used for data mining in the Configuration File.

In accordance with this embodiment, the DataBrainCmdCenter application is primarily responsible for managing a data mining job queue, and automatically distributing jobs in an array of networked Windows servers or server farm. The DataBrainCmdCenter application interfaces to User Edit and Configuration File Interface module 3055 to receive input for system configuration parameters. In accordance with one or more such embodiments, data mining jobs are defined as a set of analysis runs comprised of multiple data sets and analysis algorithms. Jobs are managed by the DataBrainCmdCenter Queue Manger application which is a master queue manager that resides over individual server slave queues. The master queue manager logically distributes data mining jobs to available servers (to be carried out by the DataBrain module) to enable jobs to run simultaneously. The results of a branched analysis run are collected by the DataBrainCmdCenter application, and they are then fed to subsequent runs, if necessary, as dictated by the Job'sConfiguration File.

In addition, the DataBrainCmdCenter application controls load balancing of the server farm. Balancing is useful to gain efficiency and control of available server resources in the server farm. Proper load balancing is achieved by real-time monitoring of individual server farm server queues, and other relative run time status information in accordance with any one of a number of methods that are well known to those of ordinary skill in the art.

In accordance with one or more such embodiments of the present invention, the DataBrainCmdCenter Account Manager application enables creation, management and status monitoring of customer accounts relative to the automated analysis being performed in accordance with any one of a number of methods that are well known to those of ordinary skill in the art. Management and status communication provides control feedback to the DataBrainCmdCenter Queue Manager application and the DataBrainCmdCenter Load Balancer application.

In accordance with one or more embodiments of the present invention, one step of data mining analysis might be used to analyze numeric data to find clusters of data that appear to provide correlations (this step may entail several data mining steps which attempt to analyze the data using various types of data that might provide such correlations). This step is driven by the types of data specified in the Configuration File. Then, in a following step, correlated data might be analyzed to determine parametric data that might be associated with the clusters (this step may entail several data mining steps which attempt to analyze the data using various types of data that might provide such associations). This step is also driven by the types of data specified in the Configuration File, and the types of data mining analyses to perform. Then, in a following step, the parametric data might be analyzed against categorical data to determine processing tools that might be correlated with associated parametric data (this step may entail several data mining steps which attempt to analyze the data using various types of processing tools that might provide such correlations). Then, in a following step, processing tool sensor data might be analyzed against the categorical data to determine aspects of the processing tools that might be faulty (this step may entail several data mining steps which attempt to analyze the data using various types of sensor data that might provide such correlations). In accordance with one such embodiment, a hierarchy of data mining analysis techniques would be to use SOM, followed by Rules Induction, followed by ANOVA, followed by Statistical methods.

Figure 9:
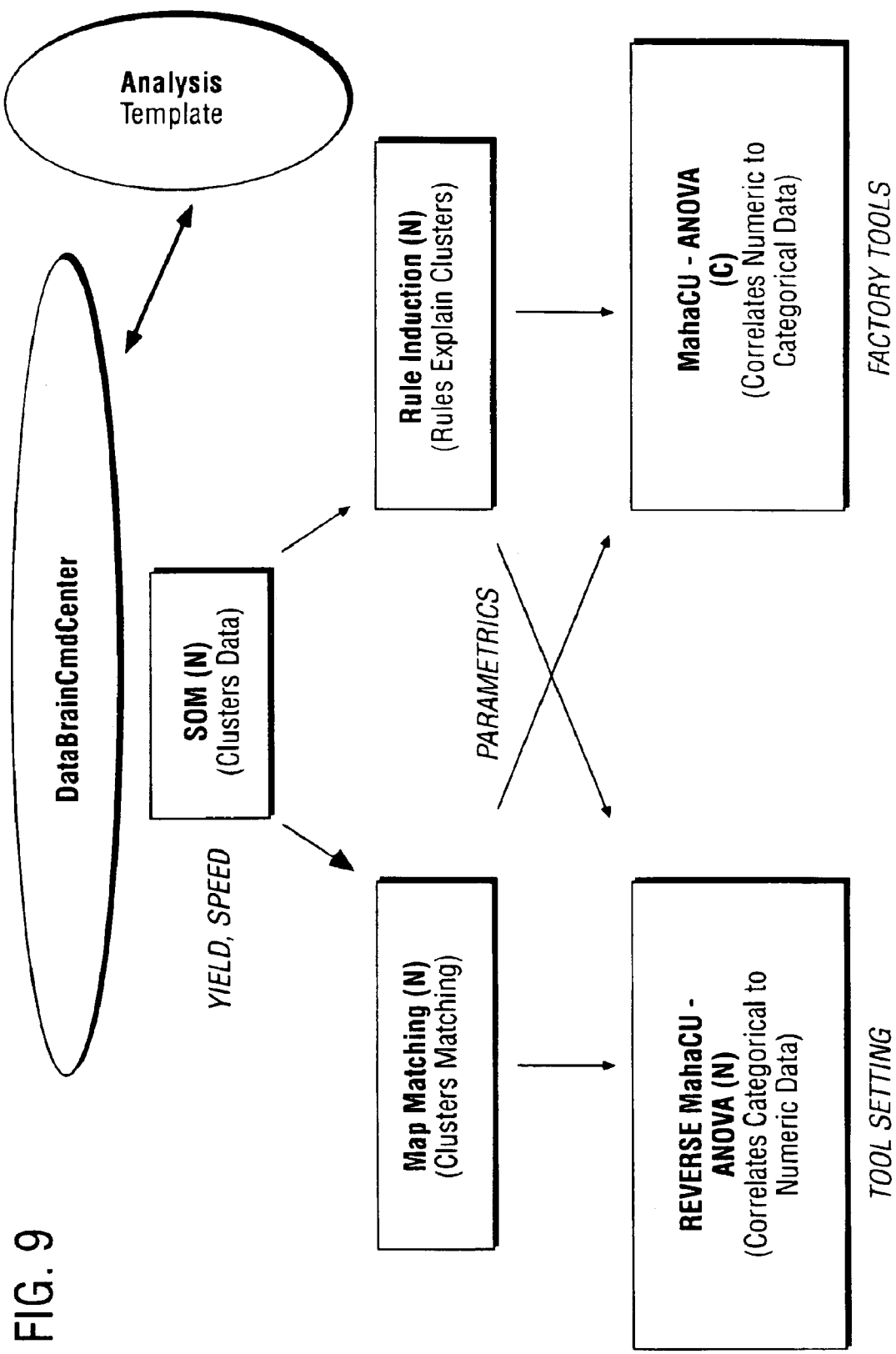
FIG. 9 shows a three level, branched data mining run.

FIG. 9 shows a three level, branched data mining run as an example. As shown in FIG. 9, the DataBrainCmdCenter application (under the direction of a user generated Analysis Template portion of a Configuration File) performs an SOM data mining analysis that clusters numeric data relating, for example, and without limitation, to yield as yield is defined to relate, for example, and without limitation, to the speed of ICs manufactured in a fab. Next, as further shown in FIG. 9, the DataBrainCmdCenter application (under the direction of the user generated Analysis Template): (a) performs a Map Matching analysis (to be described below) on the output from the SOM data mining analysis to perform cluster matching as it relates to parametric data such as, for example, and without limitation, to electrical test results; and (b) performs a Rules Induction data mining analysis on the output from the SOM data mining analysis to provide a Rules explanation of the clusters as it relates to parametric data such as, for example, and without limitation, to electrical test results. Next, as further shown in FIG. 9, the DataBrainCmdCenter application (under the direction of the user generated Analysis Template): (a) performs a Reverse MahaCu and/or ANOVA data mining analysis on the output from the Rules Induction data mining analysis to correlate categorical data to numerical data as it relates to process tool setting, for example, and without limitation, to metrology measurements made at a processing tool; and (b) performs a MahaCu and/or ANOVA data mining analysis on the output from the Map Matching data mining analysis to correlate numerical data to categorical data as it relates to a processing tool for example, and without limitation, to sensor measurements.

Figure 10:
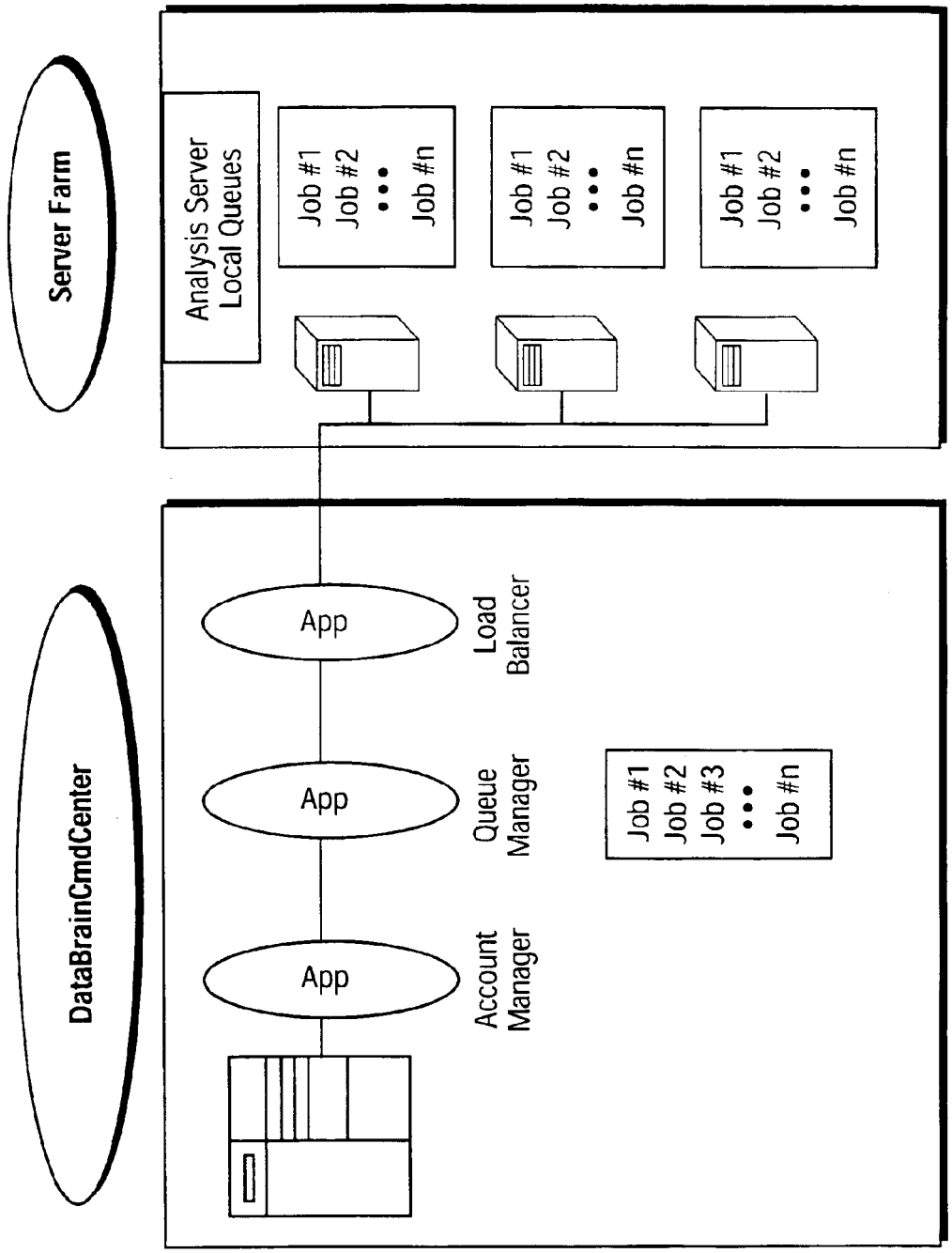
FIG. 10 shows

FIG. 10 shows distributive queuing carried out by the DataBrainCmdCenter application in accordance with one or more embodiments of the present invention. FIG. 11 shows an Analysis Template User Interface portion of User Edit and Configuration File Interface module 3055 that is fabricated in accordance with one or more embodiments of the present invention. FIG. 12 shows an Analysis Template portion of a Configuration File that is fabricated in accordance with one or more embodiments of the present invention.

In accordance with one or more embodiments of the present invention, an algorithm, referred to herein as "Map Matching," utilizes an SOM to achieve an automated and focused analysis (i.e., to provide automatic definition of problem statements). In particular, in accordance with one or more embodiments of the present invention, a SOM provides a map of clusters of wafers that have similar parameters. For example, if such a map were created for every parameter in the data set, they could be used to determine how many unique yield issues exist for a given product at a given time. As such, these maps can be used to define good "questions" to ask for further data mining analysis.

Because the nature of the self-organized map enables analysis automation, a user of the inventive SOM Map Matching technology only needs to keep a list of variable name tags within a fab that are "of concern" to accomplish full "hands off" automation. The SOM analysis automatically organizes the data and identifies separate and dominant (i.e., impacting) data clusters that represent different "fab issues" within a data set. This SOM clustering, combined with the Map Matching algorithm described below, enable each "of interest" variable to be described in terms of any historical data that is known to be impacting the behavior of the "of interest" variable on a cluster by cluster basis. In this way, use of a SOM coupled with the Map Matching algorithm enables a fab to address multiple yield impacting issues (or other important issues) with a fully automated "hands off" analysis technique.

Figure 13:
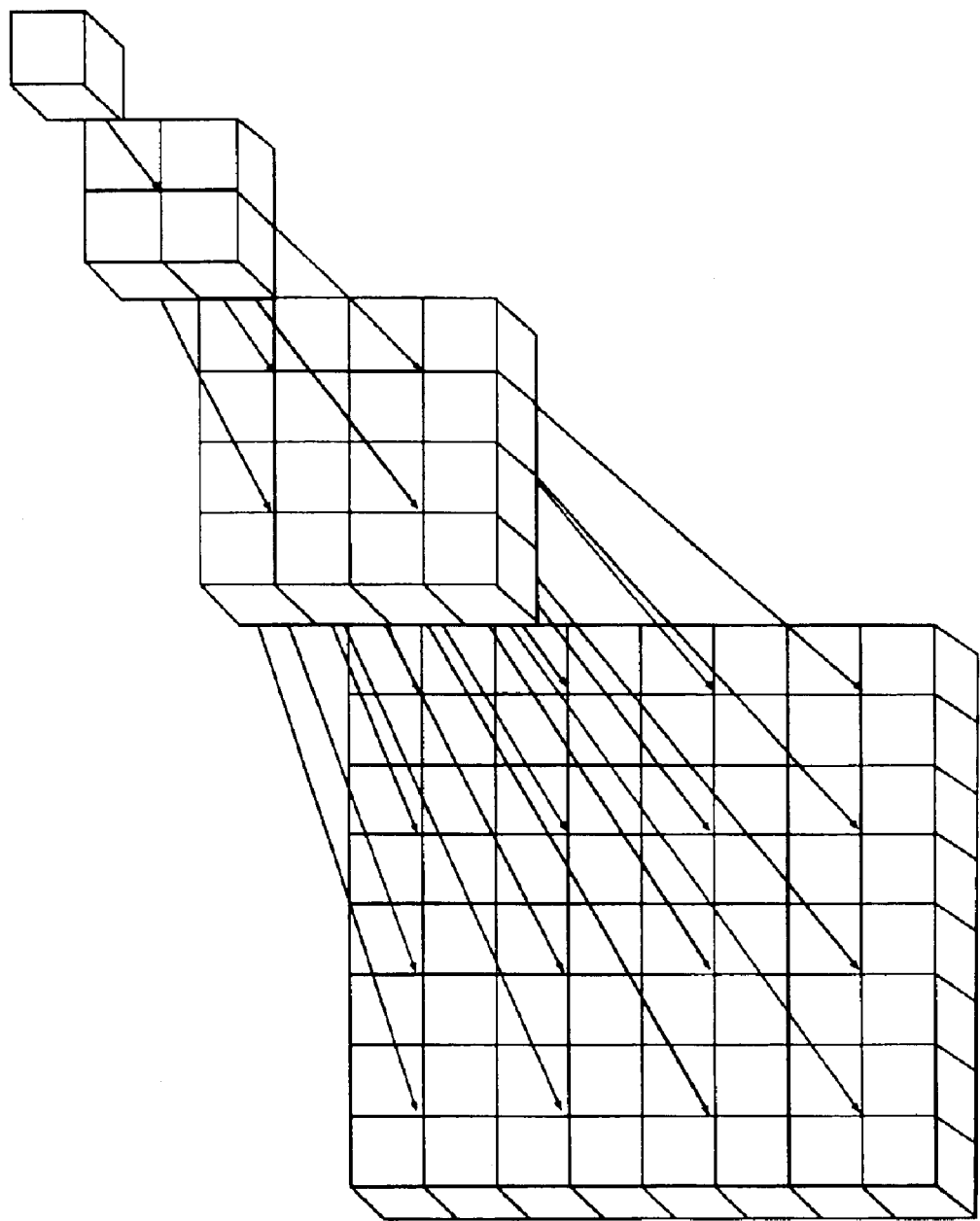
FIG. 13 shows a hyper-pyramid cube structure.
Figure 14:
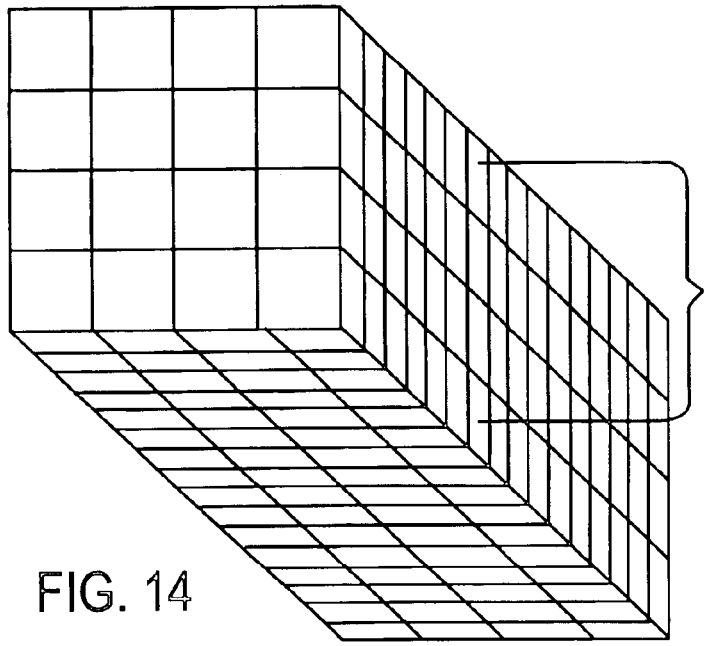
FIG. 14 shows a hyper-pyramid cube and highlights a layer.

Before a SOM analysis of a data set can be run, Self Organized Maps have to be generated for each column in the data set. To generate these maps, a hyper-pyramid cube structure is built as shown in FIG. 13. The hyper-pyramid cube shown in FIG. 13 has 4 layers. In accordance with one or more embodiments of the present invention, all hyper-pyramid cubes grow such that each layer is $2^n \times 2^n$, where n is a zero based layer number. In addition, each layer of the pyramid represents a hyper-cube, i.e., each layer of the hyper-pyramid cube represents a column within the data set. The layer shown in FIG. 14 would be layer 2 (zero based) of a 16-column data set. In accordance with one or more such embodiments, the deeper in the hyper-pyramid cube one goes, the greater the breadth of the hyper-cube ($2^n \times 2^n$), and the depth of the hyper-cube pyramid remains constant at the number of columns in the data set.

Figure 15:
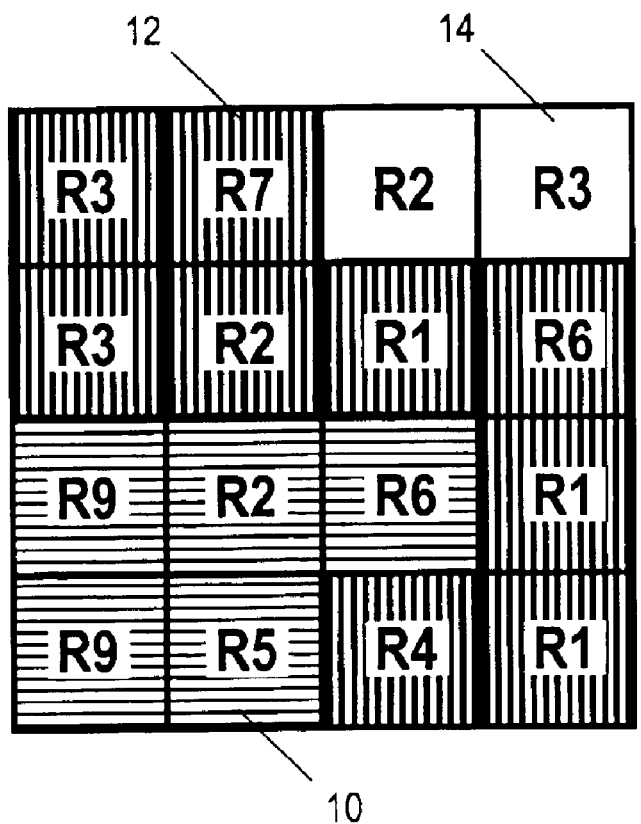
FIG. 15 shows a hyper-cube layer (self organized map) that would be from a hyper-cube extracted from the $2^{nd}$ layer of a hyper-pyramid cube.

FIG. 15 shows a hyper-cube layer (self organized map) that would be from a hyper-cube extracted from the $2^{nd}$ layer of a hyper-pyramid cube. As shown in FIG. 15, the neurons (i.e., cells) in each layer represent an approximation to the real records in that column. As one goes down in depth in the pyramid, the hyper-cubes get larger, and the neurons in the cube increase and converge to the real value of the records in the actual column that each layer of the data cube represents. Due to memory constraints and computational time involved, it is neither practical nor feasible to grow the pyramid until the neurons converge to the real value they represent. Instead, in accordance with one or more embodiments of the present invention, the pyramid is grown until a certain threshold is met, or until a predetermined maximum depth is reached. Then, in accordance with one or more embodiments of the present invention, the SOM analysis that is performed is on the last-layered cube that the pyramid generates.

Once a SOM is generated for each column of the data set, the following steps are taken to achieve an automated Map Matching data analysis.

I. Generation of Snapshots (Iterations): Given a numerical dependent variable ("DV") (data column), locate a neural map within the data cube to which this DV refers. With this neural map, generate all possible color region combinations detailing three regions. These three regions are: High (Hills), Low (Ponds), and Middle regions, and any given cell on the neural map will fall into one of these regions. For simplicity in understanding such embodiments, one assigns a Green color to the High region, a Blue color to the Middle region and a Red color to the Low region. Then, as a first step, one determines a delta that one needs to move at each interval to generate a snapshot of the color regions needed to use as a basis of automated Map Matching analysis. Note that there are two threshold markers that are needed to be moved to obtain all the snapshot combinations, i.e., there is a marker to signify the threshold for a Low region, and there is another marker for a High region. By changing these two markers, and using the delta all desired snapshot combinations can be generated.

The delta value is computed as follows; delta=(Percent of data distribution—this is a user configuration value)*2 sigma. Next the High marker and the Low marker are moved to the mean of the data in this column. In this initial state, all cells in the neural map will either fall into the Green or the Red Region. Next the Low marker is moved by a delta to the left. Then, all cells are scanned, and appropriate colors are assigned to them based on the following steps. If the associated cell value is: (mean—1.25 sigma)<cell value<Low marker then it is assigned a Red color. If the associated cell value is: (High Marker)<cell value<(mean+ 1.25 sigma) then it is assigned a Green color. If the associated cell value is: (Low Marker)<cell value<(High Marker) it is assigned a Blue color.

At each of these snapshots (iterations), all the High regions and Low regions are tagged, and a SOM Automated Analysis (to be described below) is performed. Then, the low marker is moved to the left by a delta to create another snap shot. Then, all the High and Low regions are tagged, and the SOM Automated Analysis is performed. This process is continued until the Low marker is less than (mean– 1.25 sigma). When this happens the Low marker is reset to the initial state, and the High marker is then advanced a delta to the right, and the process is repeated. This will continue until the High marker is greater than (mean+1.25 sigma). This is demonstrated with the following pseudo code.

---

Set High_Marker = Mean value of column data.
Set Low_Marker = Mean value of column data.
Set Delta = (Percent of data distribution this is a user configuration value) * 2sigma.
Set Low_Iterator = Low_Marker;

-continued

```
Set High_Interator = High_Marker
Keep Looping when (High_Iterator < (mean + 1.25 sigma)
Begin Loop
    Keep Looping when (Low_Iterator > (mean − 1.25 sigma)
    Begin Loop
        Go through each cell and color code the cells based on the
        procedure above and using the High_Iterator and Low_Iterator
        as threshold values.
        Capture this snapshot by tagging all the High and Low clusters.
        Perform Automated Map Matching analysis (see the next section
        below) on this snapshot.
        Set Low_Iterator = Low_Interator − Delta.
    End Loop
        Set High Iterator = High_Iterator + Delta.
    End Loop
```

Figure 16:
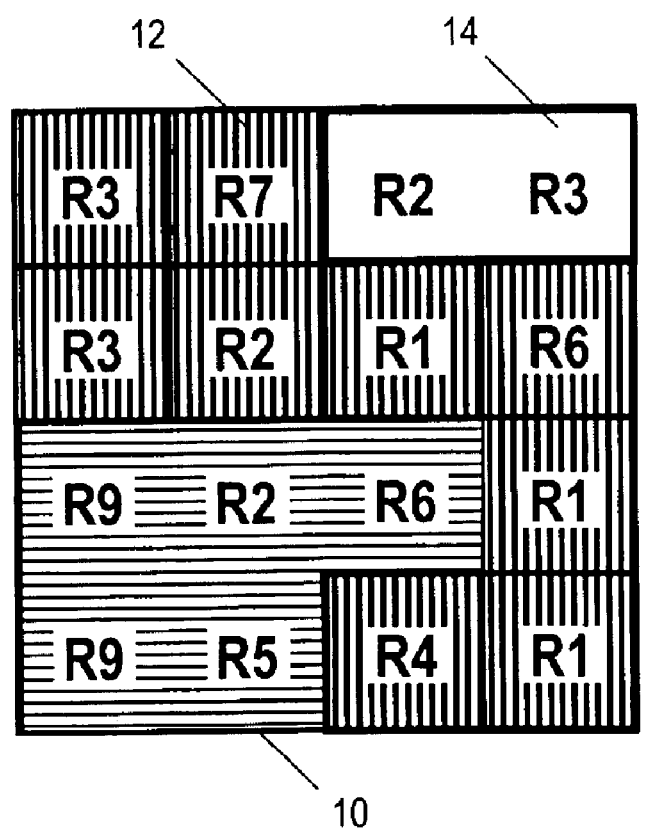
FIG. 16 shows a Self Organized Map with High, Low, and Middle regions, and with each of the High Cluster and Low cluster regions tagged for future Automated Map Matching analysis.

FIG. 16 shows a Self Organized Map with High, Low, and Middle regions, and with each of the High Cluster and Low cluster regions tagged for future Automated Map Matching analysis.

Figure 17:
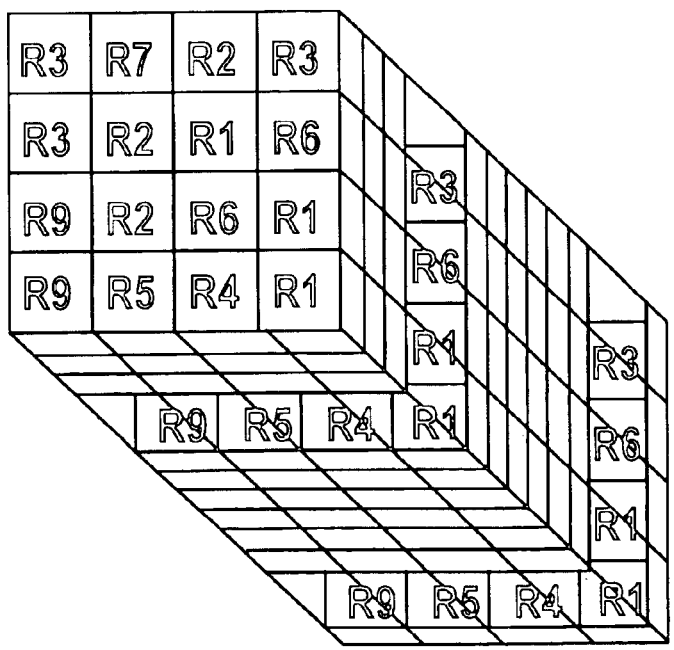
FIG. 17 shows a cell projection through a hyper-cube.

II. Automated Map Matching Analysis of a Snapshot (Iteration): Each of the 3-color region snapshots generated from step one are analyzed as follows: The interested regions (users specify whether they are interested in the Ponds (Low) or Hills (High) regions of a selected DV (column) neural map). An interested region will be referred as a Source region and other, opposite regions will be referred to as Target regions. The premise for obtaining automated SOM rankings of the other, Independent Variable ("IV") maps, i.e., columns in the data cube that are not the DV column, is based on the fact that the same dataset's row (record) is projected straight through the data cube. Thus, if a dataset's row 22 is located on row 10 column 40 of a given DV's neural map, then that cell location (22, 40) will contain row 22 of the data set for all the other IV's neural maps as well. In particular, FIG. 17 shows a cell projection through a hyper-cube. As seen from FIG. 17, a "best fit" record is established so that when it is projected through each layer of the hyper-cube, it best matches the anticipated value for each layer. Simply put, the goal is to analyze the records that comprise the Source and Target regions, and to determine how different they are from each other. Since the records that make up each group are the same across the neural maps, one can rank each neural map based on how strongly the Source's group is different from the Target's group. This score is then used to rank the neural maps from highest to lowest. The higher the score means that the two groups in the neural map are very different from one the other, and conversely the lower the score means that the two groups are very similar to one another. Thus, the goal is to find IV neural maps where the difference between the two groups is the greatest. The following shows steps used to accomplish this goal.

a. Rank the Source clusters from highest to lowest according to the impacted score. The impacted score for each of the clusters is computed as follows: Impacted Score=(Actual Column Mean−Mean of the neural Map) *Number of Unique Records in the cluster)/Total records in the column.

b. Start at the highest ranked Source cluster, and tag its Target cluster neighbors based on the following criteria: Each of these criteria are weighted accordingly, and the resulting score that is actually assigned is the average of weights.

1. How close it is to the Source cluster. This is calculated as the centroid distance from the Target cluster to the Source cluster where the centroid cell is the cell that occupies the center of the cluster. After the two cells are determined, the centroid distance is computed using the Pythagorean theorem.

2. The number of unique records in the cluster.

3. The mean of the perimeter cells as compare to the surrounding cells mean. This will give a 1-Many relationship, i.e., one Source cluster is associated with its many Target cluster neighbors.

c. Label all records in the Source cluster as Population1 and all records in the Target clusters as Population2. This will be used to determine how the two groups are different based on the following.

d. Utilize a Scoring Function to compute a "score" for the IV using Population 1 and Population as inputs. Such a Scoring Function includes, for example, and without limitation, a Modified T-Test Scoring Function; a Color Contrast Scoring Function; an IV Impact Scoring Function; and so forth.

The Modified T-Test Scoring Function is carried out as follows:

For each IV (neural) map, compute a Modified-T-TEST of Population1 vs. Population2.

The Modified-T-TEST is based on the regular T-TEST that compares two population groups. The difference is that after the T-TEST score is computed, and the final score is computed by multiplying the T-TEST score by a Reducing ratio.

Modified_T_TEST=(Reducing Ratio)*T-TEST

The Reducing ratio is computed by counting the number of records in the Target population that are above the Mean of the Source population. This number is then subtracted from the number of the records in the Target population that are below the mean of the Source population. Finally, the Reducing Ratio is computed by dividing by the total number of records in the Target population.

Reducing Ratio=Absolute Value of (# of Target records Below Source Mean−# of Target records Above Source Mean)/(Total number of records in the Target region).

Store this score for later rankings of the IV neural maps.

The Color Contrast Scoring Function is carried out as follows: compare the color contrast between Population1 and Population2 on the IV neural map.

The IV Impact Scoring Function is carried out as follows:

multiply the Color Contrast score determined above with an Impact Score based on the DV neural map.

e. Repeat step d. for each IV neural map in the hyper-cube.

f. Rank the IV neural maps according to the Modified T-TEST scores. If the Modified T-TEST scores approach zero before all the IVs are used or before a user specified threshold is met the remaining IV neural maps will be ranked using the general T-TEST scores.

g. Store the top percentage IV neural maps as specified by the user configuration settings.

III. Generate Results and Feed Results to Other Analysis Methods Select the top X % (specified by the user in the Configuration File) of IVs that have the highest total score. In accordance with one or more embodiments of the present invention, the following automated results will be generated for the user to view for each of the winning snapshots.

a. A neural map of the winning IV is displayed. The SOM map of the independent variable would be the background map with the dependent variable Hill and Pond clusters outlined on top with distinct outline colors and clear cluster labels. The legend of the map would indicate in three distinct colors (for example, Green, Red, Blue) coupled together with the actual values of the colors' boundaries thresholds.

b. The actual results run for this particular winning DV. This is the actual result of how the IVs ranked against each other for the given selected DV.

c. A smaller dataset will be written out containing only the records that make up the Source and Target regions. This smaller dataset will be the basis for further analysis by other data analysis methods. For example, to obtain automated "Questions," this smaller dataset is fed back into a Rule Induction data analysis method engine with the appropriate regions outlined from the Map Matching run. These regions will form the "Questions" that the Rule Induction analysis will explain. The Rule Induction generates rules that explain the interaction of the variables with statistical validity. It searches the database to find the hypotheses that best fit the question generated.

IV. Repeat Steps I–III above for all DVs: Repeat steps I through step III for all user specified DVs in the Configuration File. Perform overall housekeeping tasks, and prepare the report generation of the automated Map Matching results, and feed the answers of these runs to other Data Analysis methods.

Figure 18:
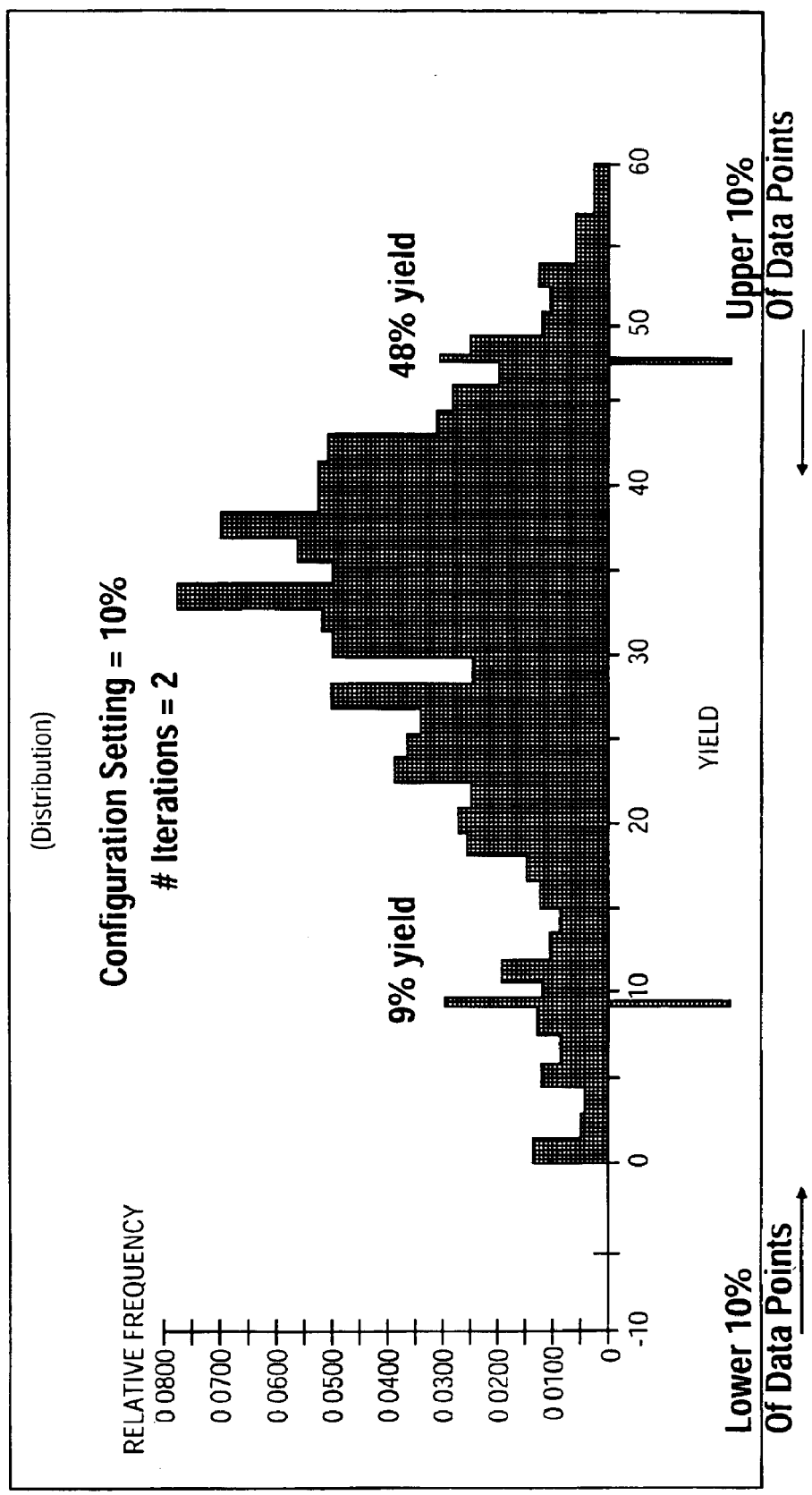
FIG. 18 shows defining "virtual" categories from a numerical distribution.
Figure 19:
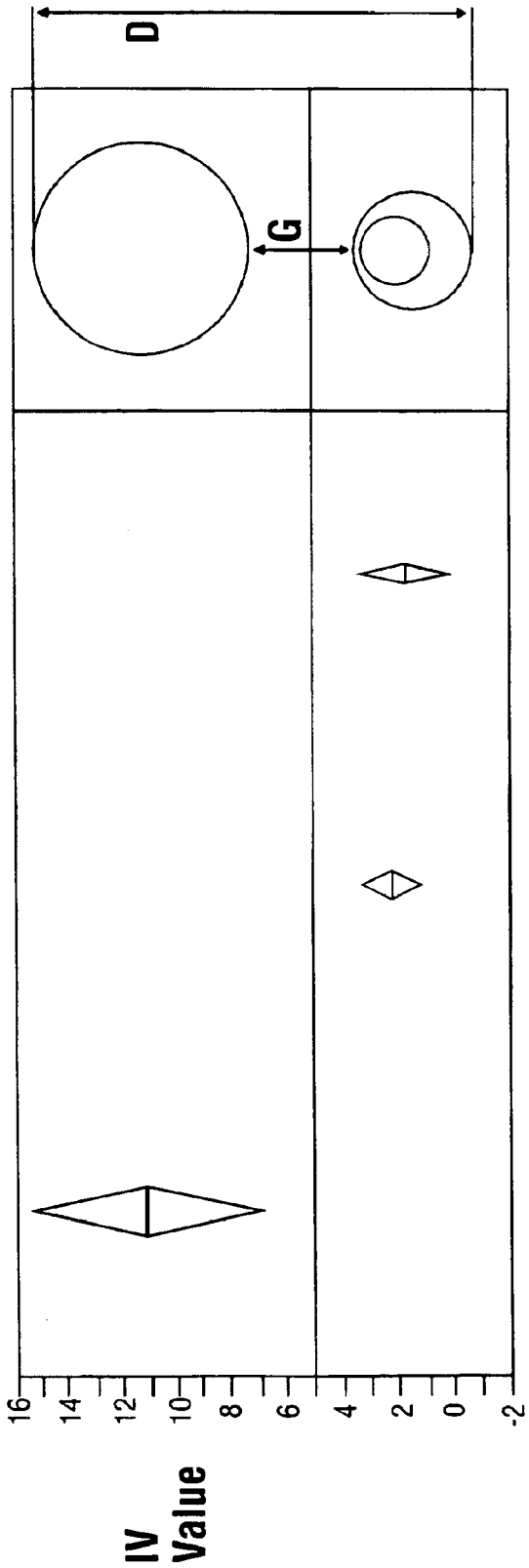
FIG. 19 shows calculating Gap Scores (a Gap score=sum of all gaps (not within any circle)) and Diameter Scores (a Diameter Score=DV average diameter of the three circles) where DV categories are based upon a numerical distribution for the DV.
Figure 20:
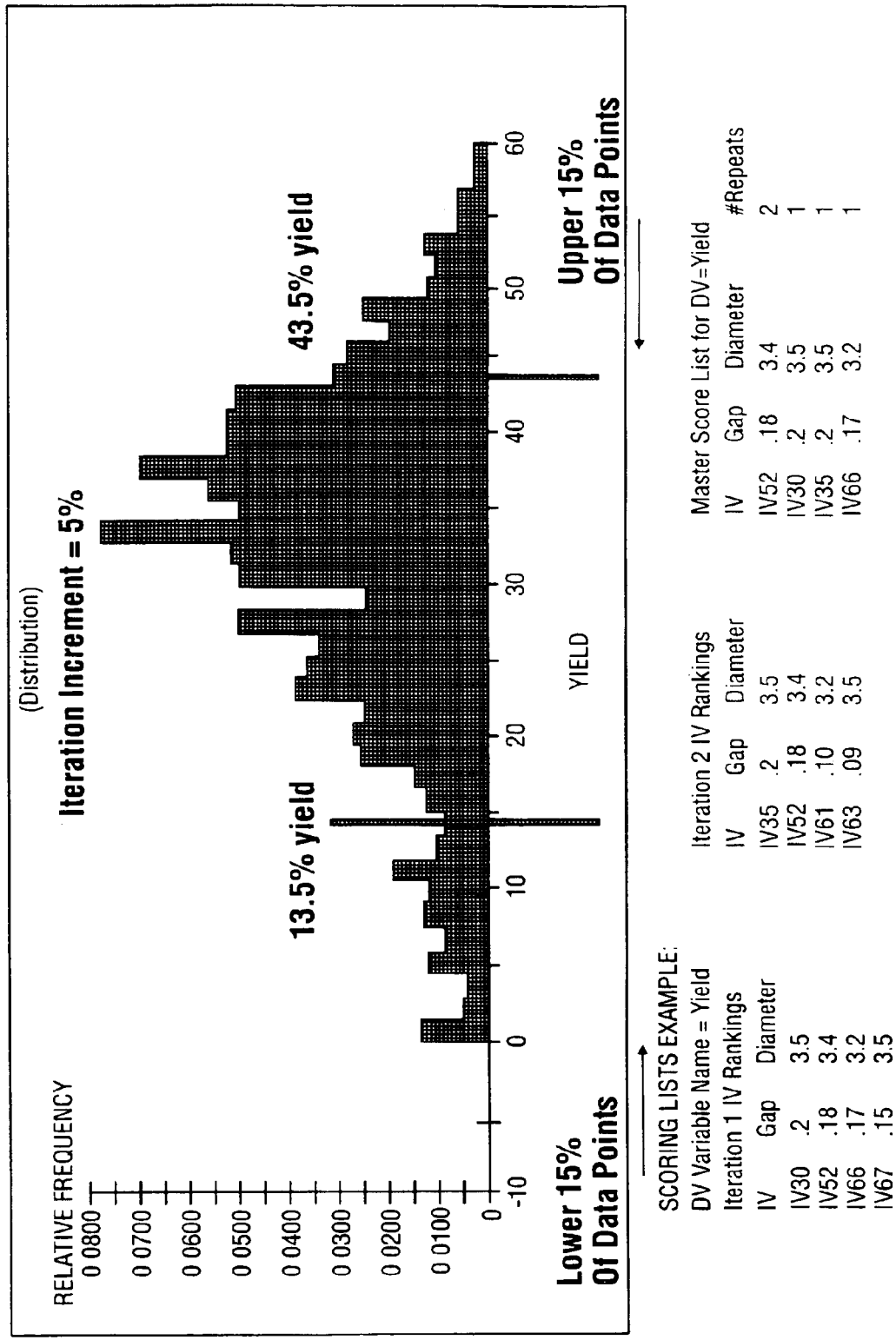
FIG. 20 shows calculating the master score for a given IV, three factors are considered: magnitude of the gap score, magnitude of the diameter score, and the number of times the IV appeared on the series of DV scoring lists.

In accordance with one or more embodiments of the present invention, the DataBrain module includes an inventive data mining algorithm application that is referred to herein as "Pigin." Pigin is an inventive data mining algorithm application that determines, for a targeted numeric variable, which other numeric variables within a data set contribute (i.e., correlate) to the designated target variable. Although Pigin does not analyze categorical data (and is, in that sense, narrower in scope than some other data mining algorithms), it performs its analysis faster and with more efficient memory utilization than other standard data mining algorithms. The algorithm deals with a targeted variable i.e., a variable to be explained by the data mining exercise, and which is referred to as a Dependent Variable ("DV"). The algorithm operates according to the following steps. Step 1: treat a DV's numeric distribution as a series of categories based upon a user configurable parameter that determines how much data is placed into each category. Step 1 is illustrated in FIG. 18 which shows defining "virtual" categories from a numerical distribution. Step 2: once the DV groups (or splits) are defined from Step 1, a series of confidence distribution circles are calculated for each DV category based on the data coinciding with that category for the other numeric variables within the data set (referred to hereafter as independent variables or "IVs"). Step 3: based upon the overall spread of the confidence circles for each IV, a diameter score and a gap score is assigned to that variable for later use in determining which IV is most highly correlated to the DV "targeted" by an analyst. High values of diameter or gap scores often indicate "better" correlations of DV to IV. Steps 2 and 3 are illustrated in FIG. 19 which shows calculating Gap Scores (a Gap score=sum of all gaps (not within any circle)) and Diameter Scores (a Diameter Score=DV average diameter of the three circles) where the DV categories are based upon the numerical distribution for the DV. In essence, FIG. 19 is a Confidence Plot where each diamond represents a population, and the endpoints of a diamond produce a circle that is plotted on the right side of the figure (these circles are what is referred to as "95% confidence circles"). Step 4: iterate. Once all of the IVs have been assigned a score based on the DV definition in Step 1, then the DV is re-defined to slightly change the definition of the splits. Once this re-definition has occurred, the scores are recalculated for all of the IVs against the new DV category definitions. The process of refining the DV category definitions continues until the number of iterations specified by the user in the Analysis Template has been met. Step 5: overall score. When all iterations are complete, there will exist a series of IV rankings based upon the various definitions of the DV as described in Steps 1 and 4. These lists will be merged to form a "master ranked" list of IVs that are most highly correlated to the target DV. When calculating the master score for a given IV, three factors are considered: magnitude of the gap score, magnitude of the diameter score, and the number of times the IV appeared on the series of DV scoring lists. These three factors, in combination with some basic "junk results" exclusion criteria, form the list of most highly correlated IVs for a given targeted DV. This is illustrated in FIG. 20. It should be understood that although one or more such embodiments have been described using a gap score and a diameter score for each IV encountered, embodiments of the present invention are not limited to these types of scores, and in fact, further embodiments exist which utilize other scoring functions to compute scores for IVs.

In accordance with one or more embodiments of the present invention, the DataBrain module includes a correlation application (MahaCu) that correlates numeric data to categorical or attributes data (for example, and without limitation, processing tool ID), which application provides: (a) fast statistical output ranked on a qualitative rule; (b) ranked scoring based on Diameter score and/or Gap score; (c) a scoring threshold used to eliminate under-represented Tool IDs; (d) an ability to select the number of top "findings" to be displayed; and (e) an ability to perform a reverse run wherein the results from the "findings" (Tool IDs) can be made the dependent variable and parameters (numbers) affected by these "findings" (Tool IDs) can be displayed.

FIG. 21 shows an example of a subset of a data matrix that is input to the above-described DataBrain module correlation application. The example shows end-of-line probe data (BIN) with process tool IDs (Eq_Id) and process times (Trackin) on a lot basis. Similar data matrices can also be created on a wafer, site (reticle) or die basis.

Figure 22:
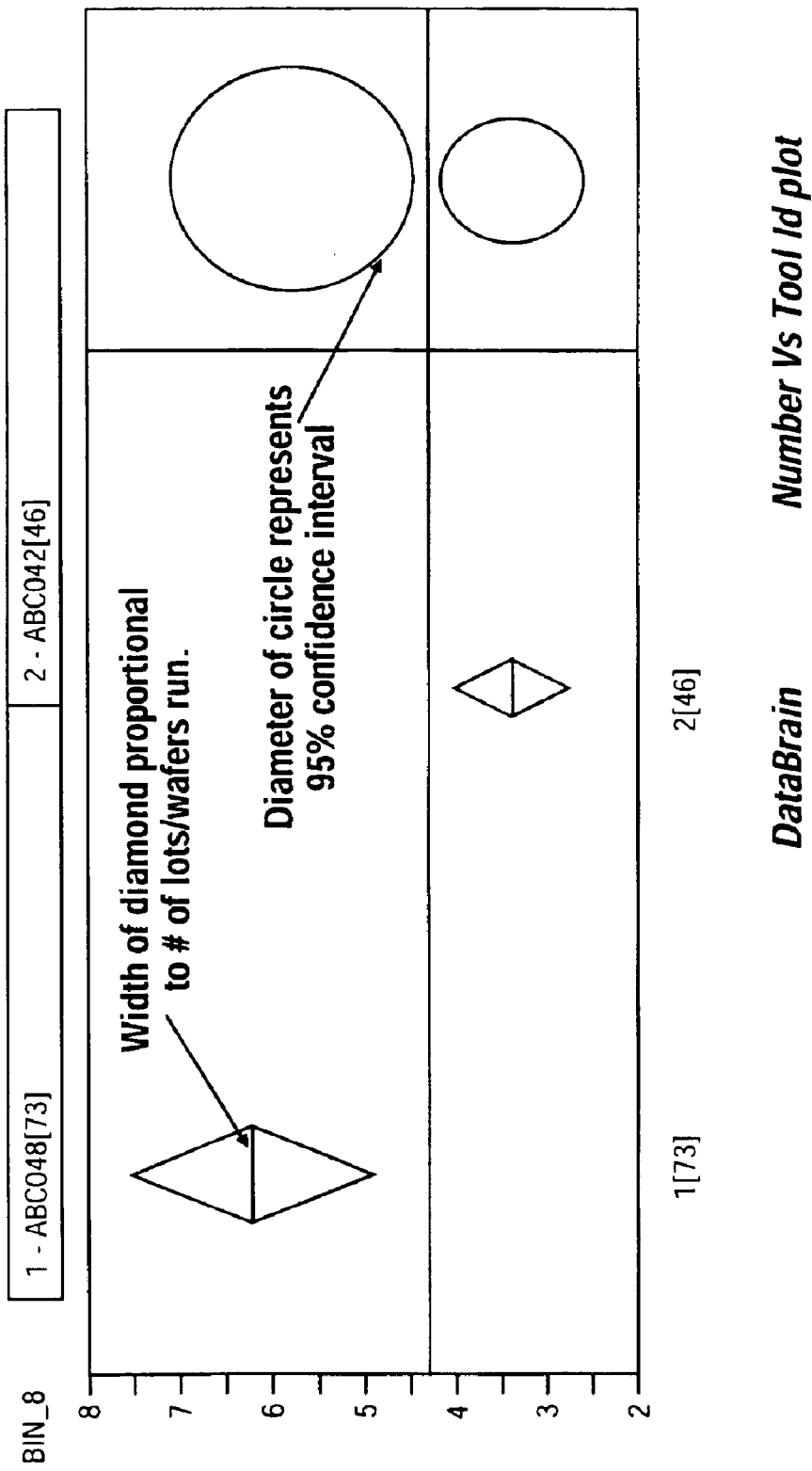
FIG. 22 shows an example of a numbers (BIN) versus category (Tool ID) run.

FIG. 22 shows an example of a numbers (BIN) versus category (Tool ID) run. Using BIN (the number) as the dependent variable, the above-described DataBrain module correlation application creates similar plots for every $Eq_{13}$ Id (category) in the data matrix. The width of the diamonds on the left pane represents the number of lots that have been run through the tool, and the diameter of the circle on the right pane represents the 95% confidence level.

In order to sort the numerous plots, the sum of the gap space between the circles (i.e., areas not surrounded by circles), and the total distance between the top of the uppermost circle and the bottom of the lowest circle is used as part of a formula to calculate what are referred to as "gap scores" or "diameter scores." The above-described DataBrain module correlation application sorts the plots in order of importance based upon a user selectable relative weighting for which type of score is preferred.

In accordance with another aspect of this embodiment of the present invention, the above-described DataBrain module correlation application sets a scoring threshold. Although there are typically a number of processing tools used for a particular process layer of an IC, only a subset of them are used on a regular basis. More often than not, those processing tools that are not used regularly skew the data, and can create unwanted noise during data processing. The above-described DataBrain module correlation application can use a user defined scoring value such that the under-represented tools can be filtered out prior to analysis. For example, if the scoring threshold is set at 90, of three tools shown in FIG. 23, XTOOL3 will be filtered out since XTOOL1 and XTOOL2 comprise over 90% of the lots.

In accordance with one or more embodiments of the present invention, the above-described DataBrain module correlation application provides a "Number of top scores" option. Using this feature, a user can determine the maximum number of results that can be displayed per dependent variable. Thus, although above-described DataBrain module correlation application performs an analysis on all independent variables, only the number of plots input in the "Number of top scores" field will be displayed.

In accordance with one or more embodiments of the present invention, the above-described DataBrain module correlation application also performs a reverse run (Reverse MahaCu) wherein categories (for example, and without limitation, Tool IDs) are made dependent variables, and numeric parameters (for example, and without limitation, BIN, Electrical Test, Metrology, and so forth) that are affected by the category are displayed in order of importance. The importance (scoring) is the same as that done during the number versus Tool ID run. These runs can be "Daisy-chained" whereby the Tool IDs detected during the normal run can be automatically made the dependent variable for the reverse run.

In accordance with one or more embodiments of the present invention, the DataBrain module includes an application, referred to as a DefectBrain module, that ranks defect issues based upon a scoring technique. However, in order to perform this analysis defect data must be formatted by Data Conversion module 3020 as will described below. FIG. 24 shows an example of a defect data file that is produced, for example, by a defect inspection tool or a defect review tool in a fab. In particular, such a file typically includes information relating to x and y coordinates, x and y die coordinates, size, defect type classification code, and image information of each defect on a wafer. In accordance with one or more embodiments of the present invention, Data Conversion module 3020 translates this defect data file into a matrix comprising sizing, classification (for example, defect type), and defect density on a die level. FIG. 25 shows an example of a data matrix created by the data translation algorithm. Then, in accordance with one embodiment of the present invention, the DefectBrain module comprises an automated defect data mining fault detection application that ranks defect issues based upon a scoring technique. In accordance with this application, the impact of a particular size bin or a defect type is quantified using a parameter referred herein as a "Kill Ratio". The Kill Ratio is defined as follows:

$$\text{Kill Ratio} = \frac{\text{\# of Bad Dies w/Defect Type}}{\text{Total \# Dies w/Defect Type}}$$

Another parameter that may also be used is % Loss which is defined as follows:

$$\text{\% Loss} = \frac{\text{\# of Bad Dies w/Defect Type}}{\text{Total \# of Bad Dies}}$$

In the above-described definitions, a bad die is referred to as a die that is not functional.

Figure 26:
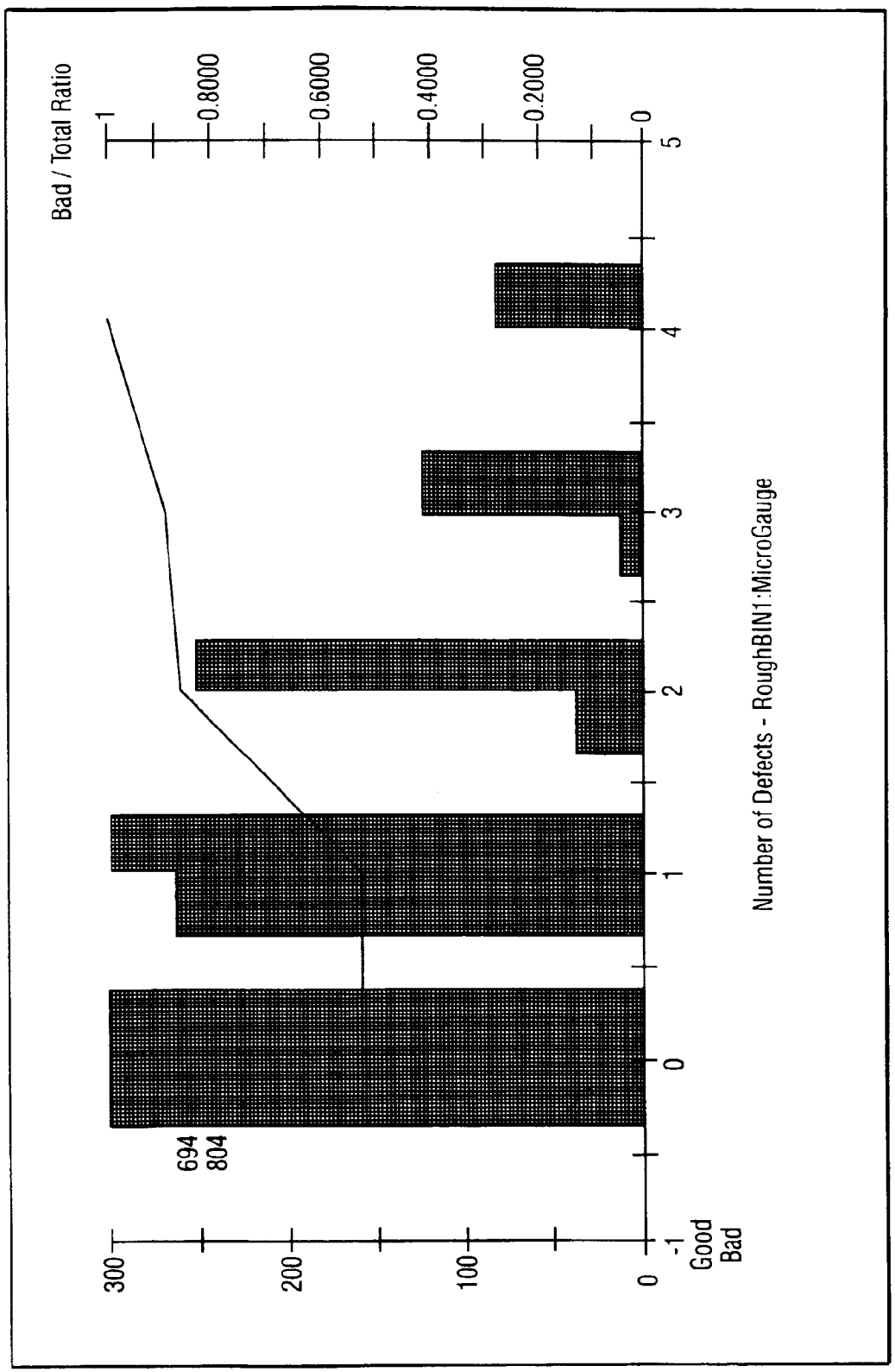
FIG. 26 shows a typical output from the DefectBrain module.

FIG. 26 shows a typical output from the DefectBrain module application. In FIG. 26, the number of dies containing a particular defect type (microgouge in this example) is plotted against the number of defects of that type on a die. Since functional (i.e., Good) and disfunctional (i.e., Bad) die information exists in the data matrix, it is straightforward to determine which of the dies containing a particular defect type were good or bad. Thus, in FIG. 26, both the good and the bad die frequency is plotted, and the ratio of the bad dies to the total number of dies containing the defect (i.e. the Kill Ratio) is graphically drawn. In such graphs, a slope of graphical segments are extracted and compared with the slope of graphical segments from all other plots generated by the DefectBrain module application, and they are ranked, starting from the highest to the lowest slopes. Graphs with the highest slopes would be the most important ones affecting yield, and would be of value to a yield enhancement engineer.

One important feature in such plots is an ability of the DefectBrain module application to tune the maximum number of "Number of Defects" bins on the x-axis. If this were not be available, in cases where there are an extraordinary number of defects on a die, like in the instance of Nuisance or False defects, the slope ranking will be erroneous.

In accordance with one or more embodiments of the present invention, the DataBrain module utilizes utilities such as, for example, data cleaners (for example, Perl and $C^{++}$ software applications that are fabricated in accordance with any one of a number of methods that are well known to those of ordinary skill in the art), data translators (for example, Perl and $C^{++}$ software applications that are fabricated in accordance with any one of a number of methods that are well known to those of ordinary skill in the art), and data filters (for example, Perl and $C^{++}$ software applications that are fabricated in accordance with any one of a number of methods that are well known to those of ordinary skill in the art), which data cleaning, data translation, and/or data filtering may be performed in accordance with criteria set forth in the Configuration File, or on an ad hoc basis upon receipt of user input. In accordance with one or more embodiments of the present invention, the DataBrain module is a software application that runs on a PC server, and is coded in C++ and SOM in accordance with any one of a number of methods that are well known to those of ordinary skill in the art.

In accordance with one or more embodiments of the present invention, output from DataBrain Engine module 3080 is Results Database 3090 that is embodied as a Microsoft FoxPro™ database. Further, in accordance with one or more embodiments of the present invention, WEB Commander module 3070 includes secure ftp transmission software that is fabricated in accordance with any one of a number of methods that are well known to those of ordinary skill in the art, which secure ftp transmission software can be used by a user or client to send data to DataBrainEngine module 3080 for analysis.

The results of the above-described data mining processes often exhibit themselves as a Boolean rule that answers a question posed to a data mining algorithm (as is the case for Rule Induction), or as some relative ranking or statistical contribution to a variable being targeted or indicated as being "important" by a template in the Configuration File. Depending on which particular data mining algorithm is used, the type of data that comprises a "result" (i.e., be it numeric data or categorical variable type) that the data mining algorithm provides is a predetermined set of statistical output graphs that can be user defined to accompany each automated data mining analysis run. In accordance with one or more embodiments of the present invention, such automated output may be accompanied by a "raw" data matrix of data used for the first pass of data mining, and/or a smaller "results" data set which includes only columns of data that comprised the "results" of the complete data mining process. After an automated data mining analysis run is complete, all such information is stored in Results Database 3090.

Results Distribution: As further shown in FIG. 3, in accordance with one or more embodiments of the present invention, WEB Visualization module 3100 runs Graphics and Analysis Engine 3110 that accesses Results Database 3090 created by DataBrain Engine module 3080 to provide, for example, and without limitation, HTML reports that are stored in WEB Server Database 3120. In accordance with one or more embodiments of the present invention, WEB Server Database 3120 may be accessed by users using a web browser at, for example, and without limitation, a PC, for delivery of reports in accordance with any one of a number of methods that are well known to those of ordinary skill in the art. In accordance with one or more embodiments of the present invention, WEB Visualization module 3100 enables interactive reporting of results, web browser enabled generation of charts, reports, Power Point files for export, Configuration File generation and modification, account administration, e-mail notification of results, and multi-user access to enable information sharing. In addition, in accordance with one or more embodiments of the present invention, WEB Visualization module 3100 enables users to create Microsoft PowerPoint (and/or Word) on-line collaborative documents that multiple users (with adequate security access) can view and modify. In accordance with one or more embodiments of the present invention, WEB Visualization module 3100 is a software application that runs on a PC server, and is coded using Java Applets, Microsoft Active Server Pages (ASP) code, and XML. For example, WEB Visualization module 3100 includes an administration module (for example, a software application that runs on a PC server, and is coded in web Microsoft ASP code in accordance with any one of a number of methods that are well known to those of ordinary skill in the art) that enables new user setup (including, for example, and without limitation, specification of security access to various system functionality), and enables user privileges (including access to, for example, and without limitation, data analysis results Configuration File setup, and the like). WEB Visualization module 3100 also includes a job viewer module (for example, a software application that runs on a PC server, and is coded in web Microsoft ASP code in accordance with any one of a number of methods that are well known to those of ordinary skill in the art) that enables users to view analysis results, and make reports. WEB Visualization module 3100 also includes a charting module (for example, a software application that runs on a PC server, and is coded in web Microsoft ASP code in accordance with any one of a number of methods that are well known to those of ordinary skill in the art) that enable users to create ad hoc charts using their web browser. WEB Visualization module 3100 also includes a join-cubes module (for example, a software application that runs on a PC server, and is coded in web Microsoft ASP code in accordance with any one of a number of methods that are well known to those of ordinary skill in the art) that enables users to combine data sets prior to data mining and/or forming hypercubes. WEB Visualization module 3100 also includes a filter module (for example, a software application that runs on a PC server, and is coded in web Microsoft ASP code in accordance with any one of a number of methods that are well known to those of ordinary skill in the art) that enables users to filter data collected in hypercubes prior to data mining being performed on such data, where such filtering is performed in accordance with user specified criteria. WEB Visualization module 3100 also includes an on-line data tools module (for example, a software application that runs on a PC server, and is coded in web Microsoft ASP code in accordance with any one of a number of methods that are well known to those of ordinary skill in the art) that enables users to perform data mining on an ad hoc basis using their web browsers. In accordance with one or more embodiments of the present invention, a user may configure the Configuration File to cause WEB Visualization module 3100 to prepare charts of statistical process control ("SPC") information that enable the user to track predetermined data metrics using a web browser.

Those skilled in the art will recognize that the foregoing description has been presented for the sake o illustration and description only. As such, it is not intended to be exhaustive or to limit the invention to the precise form disclosed. For example, although certain dimensions were discussed above, they are merely illustrative since various designs may be fabricated using the embodiments described above, and the actual dimensions for such designs will be determined in accordance with circuit requirements.

What is claimed is:

1. A method of data mining information obtained in an integrated circuit fabrication factory ("fab"), comprising the steps of:
   gathering data from the fab from one or more of systems, tools, and databases that produce data in the fab or collect data from the fab;
   formatting the data and storing the formatted data in a source database;
   extracting portions of the data for use in data mining in accordance with a user specified configuration file;
   data mining the extracted portions of data in response to a user specified analysis configuration file; and
   storing results of data mining in a results database; and
   providing access to the results;
   wherein the step of extracting includes obtaining a hypercube definition using the configuration file, using the hypercube definition to create a vector cache definition, and creating a vector cache of information.

2. The method of claim 1 wherein:
   the step of storing further includes extracting data from the source database and storing the extracted data in a hybrid database that comprises a relational database component and a file system component; and
   the step of creating a vector cache of information includes:
   (a) retrieving a list of files and data elements identified by the vector cache definition from the relational database component using hash-index keys;
   (b) retrieving the files from the file system component; and
   (c) populating the vector cache with data elements identified in the vector cache definition.

3. The method of claim 2 wherein the step of extracting further includes generating hypercubes from the vector cache information using the hypercube definition.

4. A method for data mining information obtained in an integrated circuit fabrication factory, comprising the steps of:

gathering data from the fab from one or more of systems, tools, and databases that produce data in the fab or collect data from the fab;

formatting the data and storing the formatted data in a source database;

extracting portions of the data for use in data mining in accordance with a user specified configuration file;

data mining the extracted portions of data in response to a user specified analysis configuration file;

storing results of data mining in a results database; and providing access to the results;

wherein the step of data mining includes Self Organized Map data mining to form clusters, Map Matching analysis on output from the Self Organized Map data mining to perform cluster matching, Rules Induction data mining on output from the Self Organized Map data mining analysis a rules explanations of clusters, correlating categorical data to numerical data on output from the Rules Induction data mining; and correlating numerical data to categorical data on output from the Map Matching data mining.

5. The method of claim 4 wherein the step of Self Organized Map data mining automatically organizes data, and identifies separate and dominant data clusters that represent different "fab issues" within a data set, and Map Matching analysis describes an "of interest" variable in terms of any historical data that is known to be impacting the behavior of the "of interest" variable on a cluster by cluster basis.

6. A method of data mining information obtained in a semiconductor fabrication factory, wherein the factory includes one or more process tools or measurement tools for fabricating or testing semiconductor circuits on substrates, comprising the sequential steps of:

reading, from one or more databases, data gathered from the tools, wherein the data includes one or more of measurements and fabrication process parameters;

performing a Self Ordered Map neural network analysis of the data to form a Self Ordered Map of the data so that the Self Ordered Map includes one or more clusters of similar data;

performing a Rule Induction analysis of at least one of the clusters so as to output one or more hypotheses that explain the at least one cluster; and performing a data mining analysis on the output from the Rule Induction analysis so as to identify a measurement or a process tool setting that is correlated with the one or more hypotheses.

7. A method according to claim 6, wherein the step of performing data mining analysis on the output from the Rule Induction includes:

performing a Reverse MahaCu analysis.

8. A method according to claim 6, wherein the step of performing data mining analysis on the output from the Rule Induction includes:

performing a data mining algorithm that correlates categorical data or attributes data to numerical data.

9. A method according to claim 6, wherein the step of performing a Self Ordered Map neural network analysis includes:

forming a Self Ordered Map that includes clusters of related yield data.

10. A method of data mining information obtained in a semiconductor fabrication factory, wherein the factory includes one or more process tools or measurement tools for fabricating or testing semiconductor circuits on substrates, comprising the steps of:

reading, from one or more databases, data gathered from the tools, wherein the data includes a series of data records, wherein each data record includes a value for each of a number of variables, and wherein each variable is a measurement or a fabrication process parameter;

performing a Self Ordered Map neural network analysis of the data to create a Self Ordered Map having a layer corresponding to each variable, wherein each layer includes an array of cells such that each cell is characterized by a value, and wherein the layer corresponding to one of the variables is characterized by at least one cluster of cells having values that are either greater than a high threshold value or less than a low threshold value; and performing a Map Matching analysis of one of the clusters so as to output an identification of one or more other variables having a statistical impact on said one variable.

11. A method according to claim 10, wherein said one variable is a yield parameter.

12. A method according to claim 10, wherein the step of performing the Map Matching analysis comprises the steps of:

identifying said one cluster of cells as the source cluster;

if the cells of said source cluster have values greater than said high threshold, then identifying as target cluster cells all cells in the same layer as the source cluster having values less than said low threshold; otherwise, if the cells of said source cluster have values less than said low threshold, then identifying as target cluster cells all cells in the same layer as the source cluster having values greater than said high threshold;

projecting the source cluster cells and the target cluster cells onto respective cells of the layers of the Self Ordered Map corresponding to variables other than said one variable; and ranking each of said other variables according to the degree of difference between the source cluster cells and the target cluster cells in the layer of the Self Ordered Map corresponding to that variable.

13. A method according to claim 12, wherein the step of ranking each of said other variables comprises determining the distance between a centroid of the source cluster cells and a centroid of the target cluster cells in the layer of the Self Ordered Map corresponding to that variable.

14. A method according to claim 12, wherein the step of ranking each of said other variables comprises determining a number of data records corresponding to the source cluster cells and a number of data records corresponding to the target cluster cells in the layer of the Self Ordered Map corresponding to that variable.

15. A method according to claim 12, wherein the step of ranking each of said other variables comprises determining the mean of the values of the cells at the perimeter of each cluster as compared to the mean of the values of the cells surrounding that cluster in the layer of the Self Ordered Map corresponding to that variable.

16. A method according to claim 12, wherein the step of ranking each of said other variables comprises the steps of:

identifying as source data records a number of the data records that correspond to the source cluster cells;

identifying as target data records a number of the data records that correspond to the target cluster cells;

determining a T-test score for a first population consisting of the source data records and a second population consisting of the target data records;

determining a mean of the value of that variable for the source data records;

determining a reducing ratio for that variable as the absolute value of a first value divided by a second value, wherein the first value is the difference between (i) the number of target data records for which the value of that variable is less than said mean and (ii) the number of target data records for which the value of that variable is greater than said mean, and wherein the second value is the number of target data records; and determining a modified T-test score for that variable as the reducing ratio for that variable multiplied by the T-test score.

17. A method according to claim 12, further comprising the steps of:

changing at least one of the low threshold value and the high threshold value; and repeating the step of performing the Map Matching analysis.

18. A method according to claim 12, further comprising the steps of:

identifying a subset of said data records for which the value of said one variable is less than the low threshold value or greater than the high threshold value; and performing additional data mining analysis of said subset of data records so as to exclude from the additional data mining analysis all data records for which the value of said one variable is between the low threshold value and the high threshold value.

19. A method according to claim 18, wherein the additional data mining analysis comprises Rule Induction analysis to generate rules that explain the interaction of the variables.

20. A method according to claim 10, further comprising the step of:

performing a data mining analysis on the output from the Map Matching analysis so as to identify categorical data that is correlated said output.

21. A method according to claim 20, wherein the step of performing data mining analysis on the output from the Map Matching includes:

performing a MahaCu analysis.

22. A method according to claim 20, wherein the step of performing data mining analysis on the output from the Map Matching includes:

identifying a process tool that is correlated with said output.

23. A method of data mining information obtained in a semiconductor fabrication factory, wherein the factory includes one or more process tools or measurement tools for fabricating or testing semiconductor circuits on substrates, comprising the steps of:

reading, from one or more databases, data gathered from the tools, wherein the data includes a series of data records, wherein each data record includes a value for each of a number of variables, and wherein each variable is a measurement or a fabrication process parameter;

performing a Self Ordered Map neural network analysis of the data to create a Self Ordered Map having a layer corresponding to each variable, wherein each layer includes an array of cells such that each cell is characterized by a value, and wherein the layer corresponding to one of the variables is characterized by at least one cluster of cells having values that are either greater than a high threshold value or less than a low threshold value; and performing additional data mining analysis of a subset of the data records, wherein the subset excludes all data records for which the value of said one variable is between the low threshold value and the high threshold value.

24. A method according to claim 23, wherein the additional data mining analysis comprises Rule Induction analysis to generate rules that explain the interaction of the variables.

* * * * *